(12) United States Patent
Simkhay et al.

(10) Patent No.: US 8,726,143 B2
(45) Date of Patent: May 13, 2014

(54) SYSTEM AND METHOD FOR A SPREADSHEET APPLICATION SUPPORTING DIVERSE FORMULAIC FUNCTIONS

(75) Inventors: Roy Simkhay, Seattle, WA (US);
Charles D. Ellis, Seattle, WA (US);
Alexander Babanov, Redmond, WA (US); David F. Gainer, Redmond, WA (US); Daniel P. Cory, Seattle, WA (US); Matthew J. Androski, Bellevue, WA (US); Andrew J. Becker, Bellevue, WA (US); Jeremy R. Pankratz, Fall City, WA (US); Monica McAmis, Redmond, WA (US); Simon Loftus Peyton Jones, Cambridge (GB)

(73) Assignee: Microsoft Corporation, Redmond, WA (US)

( * ) Notice: Subject to any disclaimer, the term of this patent is extended or adjusted under 35 U.S.C. 154(b) by 383 days.

(21) Appl. No.: 11/036,500

(22) Filed: Jan. 14, 2005

(65) Prior Publication Data

US 2006/0161844 A1 Jul. 20, 2006

(51) Int. Cl.
*G06F 17/00* (2006.01)
(52) U.S. Cl.
USPC ............................ 715/219; 715/212; 715/220
(58) Field of Classification Search
USPC ......... 715/503, 504, 530, 531, 538, 212, 213, 715/217, 219, 220, 255, 256, 267
See application file for complete search history.

(56) References Cited

U.S. PATENT DOCUMENTS

| 6,988,241 | B1* | 1/2006 | Guttman et al. | 715/503 |
| 7,010,779 | B2* | 3/2006 | Rubin et al. | 717/106 |
| 7,058,558 | B2* | 6/2006 | Reichenthal | 703/17 |
| 2004/0205524 | A1* | 10/2004 | Richter et al. | 715/503 |

OTHER PUBLICATIONS

Microsoft Excel Help File, Microsoft Corporation, 2000, Microsoft Excel 2000, pp. 1-8.*
Chip Pearson, "Pearson Software Consulting, LLC," Oct. 17, 2003, Pearson Software Consulting, LLC.*
Microsoft Office Excel 2003 Help file, 2003, Microsoft Corporation, Microsoft Office 2003.*
"VBA Tips: Build an Excel Add-In," May 10, 2004, fontstuff.com, pp. 1-10, <http://www.fontstuff.com/VBA/vbatut03.htm>.*

* cited by examiner

*Primary Examiner* — Stephen Hong
*Assistant Examiner* — Keith Bloomquist
(74) *Attorney, Agent, or Firm* — Jim Ross; Brian Haslam; Micky Minhas

(57) ABSTRACT

A spreadsheet application or other application supporting formulaic cells that automatically provides support for a number of diverse formulaic functions. The automatically provided diverse formulaic functions include a function returning the value of the formula logic if the logic can be evaluated without an error. Another function finds a value in a formulaic cell that is in the same row as a particular value from the first column and the same column as a particular value in the first row. Other functions allow a selection of a set of multiple lookup rows and columns for matching the values used as variables in the function. The spreadsheet application is further configured to automatically supply other functions in addition to those described.

23 Claims, 19 Drawing Sheets

| | A | B | C | D |
|---|---|---|---|---|
| 1 | Machine usage | | | |
| 2 | | Machine1 | Machine2 | Machine5 |
| 3 | Jan 1 | Tandon | Simkhay | McAmis |
| 4 | Jan 2 | Pankratz | Becker | Boon |
| 5 | Jan 5 | Ellis | Duzak | Mears |
| 6 | Jan 6 | Casey | Bedford | Chen |

=ILOOKUP(DATE(2004,1,4), "Machine5", A2:D6,0)

Fig.6

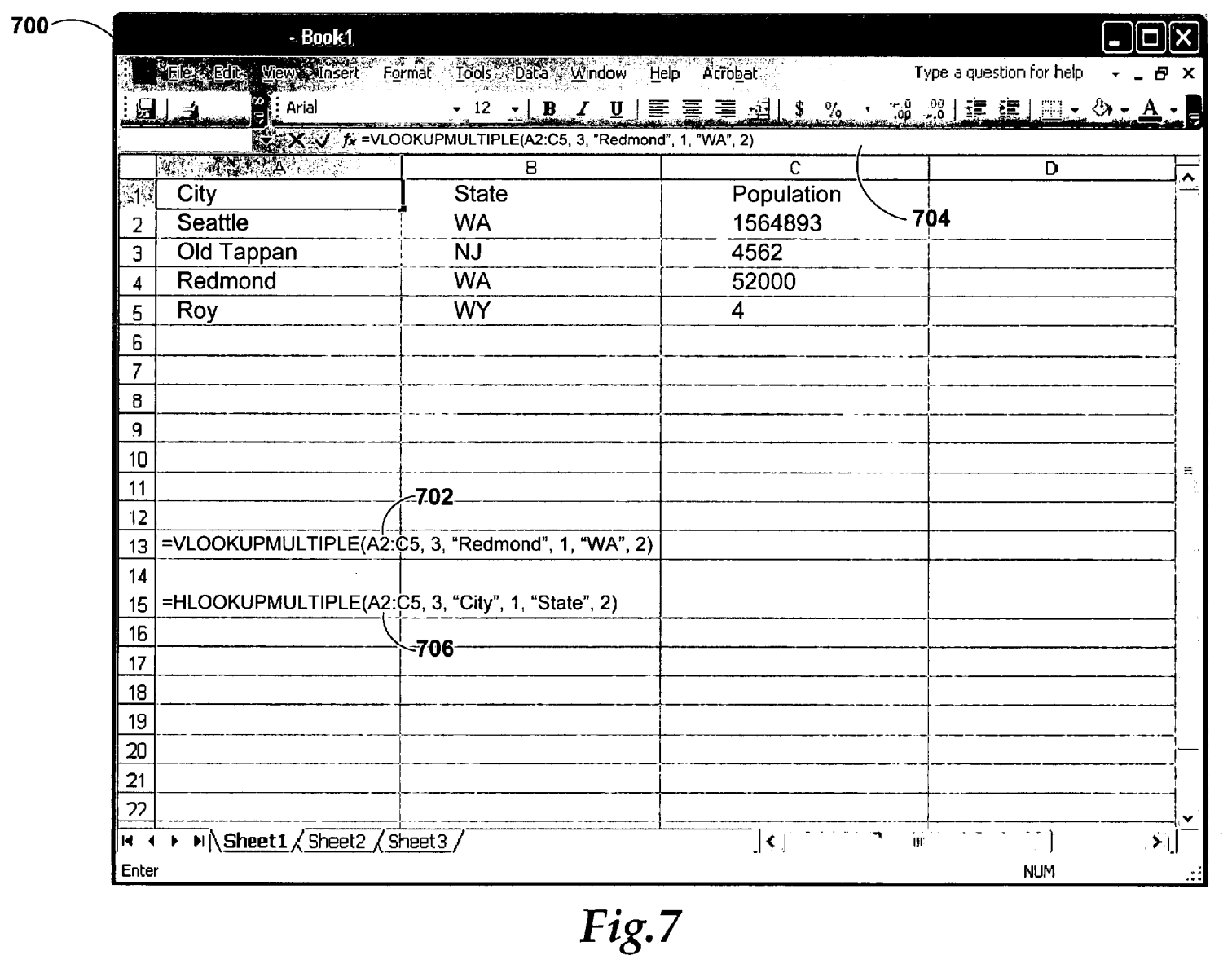

|   | A | B | C | D |
|---|---|---|---|---|
| 1 | City | State | Population | |
| 2 | Seattle | WA | 1564893 | ←704 |
| 3 | Old Tappan | NJ | 4562 | |
| 4 | Redmond | WA | 52000 | |
| 5 | Roy | WY | 4 | |
| 6 | | | | |
| 7 | | | | |
| 8 | | | | |
| 9 | | | | |
| 10 | | | | |
| 11 | | | | |
| 12 | | | | |
| 13 | =VLOOKUPMULTIPLE(A2:C5, 3, "Redmond", 1, "WA", 2) ←702 | | | |
| 14 | | | | |
| 15 | =HLOOKUPMULTIPLE(A2:C5, 3, "City", 1, "State", 2) ←706 | | | |

*Fig. 7*

| | A | B |
|---|---|---|
| 1 | Country | Revenue |
| 2 | US | 10030 |
| 3 | Germany | 2357 |
| 4 | UK | 1989 |
| 5 | Switzerland | #N/A |
| 6 | Canada | 744 |
| 7 | Italy | #N/A |
| 8 | Sweden | 597 |
| 9 | France | 533 |
| 10 | Netherlands | 418 |
| 11 | Portugal | 239 |
| 12 | | |
| 13 | | |
| 14 | | |
| 15 | | |
| 16 | =CONCATENATERANGE(" ", A2:A5) | |

902 (pointing to cell A16 formula)
904 (pointing to formula bar: =CONCATENATERANGE(" ", A2:A5))
900

| | A | B | C | D |
|---|---|---|---|---|
| 1 | Sept 1, 2004 | Holidays | | |
| 2 | Feb 29, 2004 | Sept 6, 2004 | | |
| 3 | | Nov 25, 2004 | | |
| 4 | | Nov 26, 2004 | | |
| 5 | | Dec 23, 2004 | | |
| 6 | | | | |
| 7 | =DATEADD(A1, 3, 5, 0, B2:B5) | | | |

Fig.11

| | A | B | C | D |
|---|---|---|---|---|
| 1 | Assignment | Grade | Weight | |
| 2 | HW1 | 71 | 15% | |
| 3 | HW2 | 63 | 15% | |
| 4 | Midterm | 84 | 30% | |
| 5 | Final | 97 | 40% | |
| 6 | | | | |
| 7 | =WEIGHTEDAVERAGE(B2:B5,C2:C5) | | | |

Formula bar: =WEIGHTEDAVERAGE(B2:B5,C2:C5)

*Fig.15*

| | A | B | C | D |
|---|---|---|---|---|
| 1 | Primary Contact | Specification | | |
| 2 | Roy | New functions | | |
| 3 | Roy | Better scrollbars | | |
| 4 | Brandon | Voice-activated comments | | |
| 5 | Sam | 3D shapes in cells | | |
| 6 | Brandon | Pig Latin support | | |
| 7 | | | | |
| 8 | =COUNTDISTINCT(A2:A6) | | | |

Fig.16

| | A | B | C | D |
|---|---|---|---|---|
| 1 | Student | HW1 Grade | Midterm Grade | Final Exam Grade |
| 2 | Brandon | 95 | 85 | 100 |
| 3 | Charlie | 94 | 80 | 100 |
| 4 | Sam | 96 | 90 | 100 |
| 5 | Roy | 0 | 75 | 0 |
| 6 | | | | |
| 7 | | | | |
| 8 | | | | |
| 9 | | | | |
| 10 | | | | |
| 11 | | | | |
| 12 | | | | |
| 13 | =SORTRANGE(A2:D5) | | | |

*Fig.17*

| | A | B | C | D |
|---|---|---|---|---|
| 1 | Primary Contact | Specification | | |
| 2 | Roy | New functions | | |
| 3 | Roy | Better scrollbars | | |
| 4 | Brandon | Voice-activated comments | | |
| 5 | Sam | 3D shapes in cells | | |
| 6 | Brandon | Pig Latin support | | |
| 7 | | | | |
| 8 | =DISTINCT(A2:A6) | | | |

*Fig.18*

| | Student | HW1 Grade | Midterm Grade | Final Exam Grade |
|---|---|---|---|---|
| 1 | | | | |
| 2 | Brandon | 95 | 85 | 100 |
| 3 | Charlie | 94 | 80 | 100 |
| 4 | Sam | 96 | 90 | 100 |
| 5 | Roy | 0 | 75 | 0 |
| 6 | | | | |
| 7 | | | | |
| 8 | | | | |
| 9 | | | | |
| 10 | | | | |
| 11 | | | | |
| 12 | | | | |
| 13 | =FILTER(A2:D5,2,">65") | | | |

Fig.19

SYSTEM AND METHOD FOR A SPREADSHEET APPLICATION SUPPORTING DIVERSE FORMULAIC FUNCTIONS

BACKGROUND OF THE INVENTION

Many spreadsheet applications may offer a variety of pre-established formulas or functions that are usable within a spreadsheet application. The range of available functions may vary greatly. A measure of usefulness for a spreadsheet application may depend on the variety of functions and which functions are available for use within the spreadsheet application. Currently, many functions are unavailable and unsupported by existing spreadsheet applications. Accordingly, there is a need for a spreadsheet application that provides support for these additional functions.

SUMMARY OF THE INVENTION

The present invention generally relates to a system and method for a spreadsheet application that supports a diverse set of automatically supplied formulaic functions. The functions are automatically supplied in that a user is not required to perform additional calculations to achieve the desired result than enter the function itself. Each of the automatically supplied functions provided according to the spreadsheet application of the present invention may solve for a different problem. For example, a first function, referred to herein as the IFERROR function, wraps a piece of formula logic written in the spreadsheet application and returns the value of the formula logic if the logic can be evaluated without an error. Otherwise the IFERROR function returns a user-specified value if the formula logic does evaluate to an error.

Another function provided by the spreadsheet application of the present invention is a function referred to herein as the NONERROR function. The NONERROR function, given a range of formulaic cell and a formula, returns the values in the range of formulaic cells that do not evaluate to an error when the formula is evaluated.

Additionally, the spreadsheet application of the present invention provides another function, referred to herein as the TABLELOOKUP function, that finds a value in a formulaic cell that is in the same row as a particular value from the first column and the same column as a particular value in the first row. Yet another set of functions provided in accordance with the present invention are a set of functions referred to herein as the VLOOKUPMULTIPLE function and the HLOOKUPMULTIPLE function. The VLOOKUPMULTIPLE and HLOOKUPMULTIPLE functions allow a user to specify the return row or column that may be located to the left or right of the lookup row or column respectively. These functions also allow a selection of a set of multiple lookup rows and columns for matching the values used as variables in the function.

Another set of functions supported in the spreadsheet application of the present invention are functions referred to herein as the WORD function and the WORDCOUNT function. These functions parse pieces of text out of a longer text string by tokenizing the string according to either a set of built-in or user-defined delimiters. The WORD function returns the tokens and the WORDCOUNT function returns the number of tokens.

Still another function provided by the spreadsheet application of the present invention is referred to herein as the CONCATENATERANGE function. This function operates to concatenate strings of text over a range of formulaic cells and insert a text string in-between the strings in the range(s).

Yet another function supported by the present invention spreadsheet application is a function referred to herein as the DATEDIFFERENCE function. The DATEDIFFERENCE function operates to calculate the number of days, months or years between two dates entered into formulaic cells of a spreadsheet document.

Another function supported by the present invention spreadsheet application is a function referred to herein as the DATEADD function. The DATEADD function allows a user to specify a date, and specify the number of days, months or years for incrementing that data. The function also allows the user to specify if the resulting date should not fall on a particular set of dates or days of the week (e.g., weekend days).

A further function supported by the present invention spreadsheet application is a function referred to herein as the WEEKNUMISO function. This function operates to increment the weeks of the calendar year in accordance with the ISO (International Organization for Standardization) standard.

Still another set of functions supported by the spreadsheet application of the present invention are a set of functions referred to herein as the AVERAGEIF function and the AVERAGEIFS function. The AVERAGEIF function averages formulaic cells within a range of formulaic cells that satisfy a given criteria. The AVERAGEIFS function averages formulaic cells within a range of formulaic cells that satisfy multiple criteria.

Yet another set of functions supported by the spreadsheet application of the present invention are a set of functions referred to herein as the SUMIFS function and the COUNTIFS function. The SUMIFS and COUNTIFS functions respectively sum and count the formulaic cells in a range of formulaic cells that satisfy multiple user-specified criteria.

A further function supported by the present invention spreadsheet application is a function referred to herein as the WEIGHTEDAVERAGE function. This function averages the numbers included in formulaic cells within a range of formulaic cells based on a proportional relevance specified by the user.

Still another function provided in accordance with the spreadsheet application of the present invention is a function referred to herein as the COUNTDISTINCT function. The COUNTDISTINCT function operates to count the number of rows in a range of formulaic cells while counting rows with duplicate data only once.

Yet another function provided by the spreadsheet application of the present invention is a function referred to herein as the SORTRANGE function. This function returns a sorted array of values that are included in formulaic cells, wherein the formulaic cells are included in a range or array of formulaic cells.

Additionally, the spreadsheet application of the present invention provides another function, referred to herein as the DISTINCT function, that takes a set of values arranged in an array of formulaic cells and returns the set of values as a vertical array without any duplication of values.

A further function provided by the spreadsheet application of the present invention is a function referred to herein as the FILTER function. The FILTER function, given a range of formulaic cells and a set of filter criteria, returns the rows in the range of formulaic cells that match the criteria.

BRIEF DESCRIPTION OF THE DRAWINGS

FIG. 6 illustrates a spreadsheet document including another automatically supplied function in accordance with the present invention.

FIG. 7 illustrates a spreadsheet document including another automatically supplied function in accordance with the present invention.

FIG. 9 illustrates a spreadsheet document including another automatically supplied function in accordance with the present invention.

FIG. 10 illustrates a spreadsheet document including another automatically supplied function in accordance with the present invention.

FIG. 11 illustrates a spreadsheet document including another automatically supplied function in accordance with the present invention.

FIG. 15 illustrates a spreadsheet document including another automatically supplied function in accordance with the present invention.

FIG. 16 illustrates a spreadsheet document including another automatically supplied function in accordance with the present invention.

FIG. 17 illustrates a spreadsheet document including another automatically supplied function in accordance with the present invention.

FIG. 18 illustrates a spreadsheet document including another automatically supplied function in accordance with the present invention.

FIG. 19 illustrates a spreadsheet document including another automatically supplied function in accordance with the present invention.

DETAILED DESCRIPTION

Embodiments of the present invention now will be described more fully hereinafter with reference to the accompanying drawings, which form a part hereof, and which show, by way of illustration, specific exemplary embodiments for practicing the invention. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Illustrative Operating Environment

Figure 1:
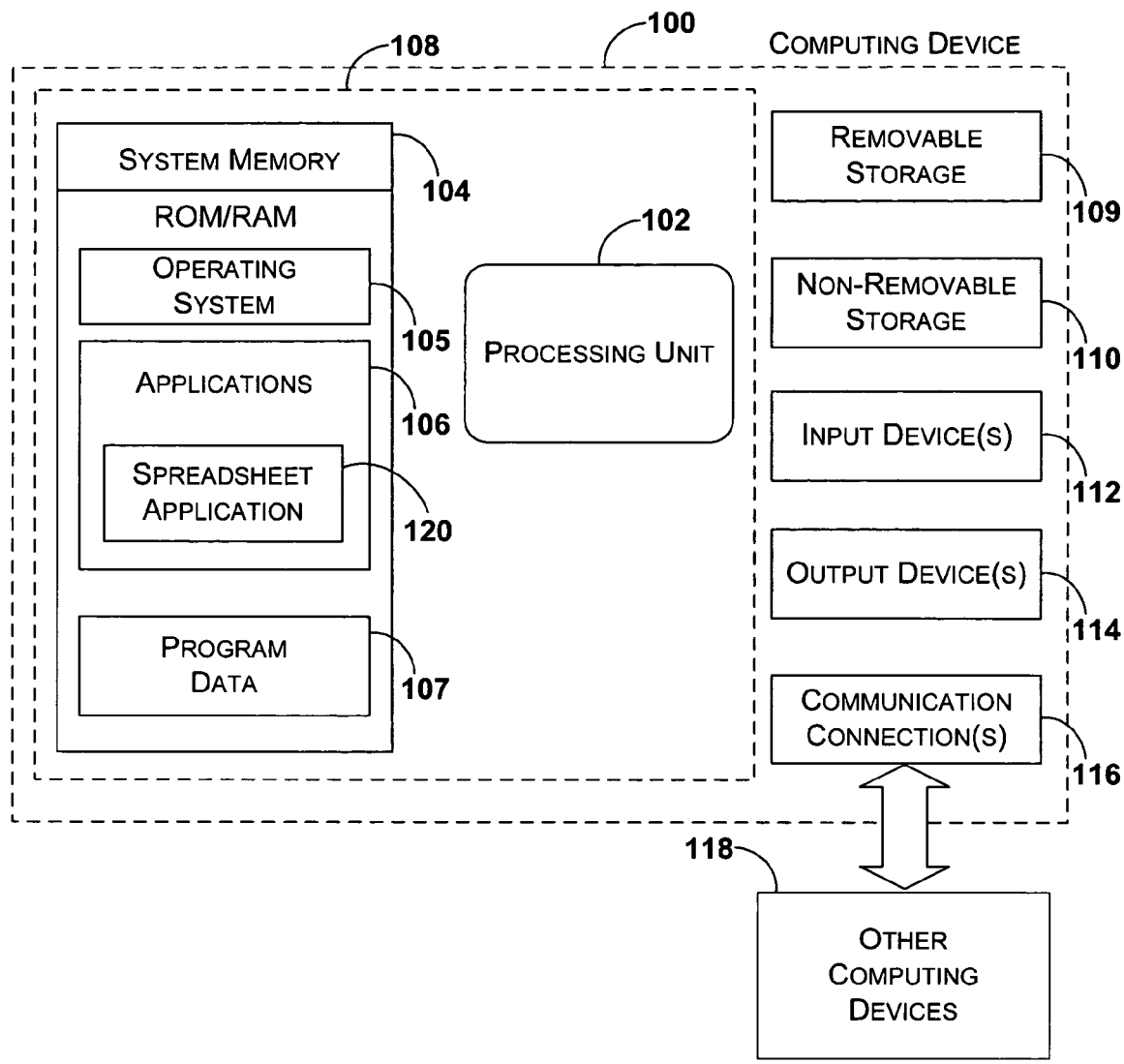
FIG. 1 illustrates an exemplary computing device that may be used in one exemplary embodiment of the present invention.

Referring to FIG. 1, an exemplary system for implementing the invention includes a computing device, such as computing device 100. In a basic configuration, computing device 100 typically includes at least one processing unit 102 and system memory 104. Depending on the exact configuration and type of computing device, system memory 104 may be volatile (such as RAM), non-volatile (such as ROM, flash memory, and the like) or some combination of the two. System memory 104 typically includes an operating system 105, one or more applications 106, and may include program data 107. In one embodiment, applications 106 further include a cell formatting application 120 that, in combination with the other portions of computing device 100, provides the functionality of the present invention. This basic configuration is illustrated in FIG. 1 by those components within dashed line 108.

Computing device 100 may also have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and non-volatile, removable and non-removable media implemented in any method or technology for storage of information, such as computer readable instructions, data structures, program modules or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included. All these devices are known in the art and need not be discussed at length here.

Computing device 100 also contains communications connection(s) 116 that allow the device to communicate with other computing devices 118, such as over a network or a wireless mesh network. Communications connection(s) 116 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Figure 2:
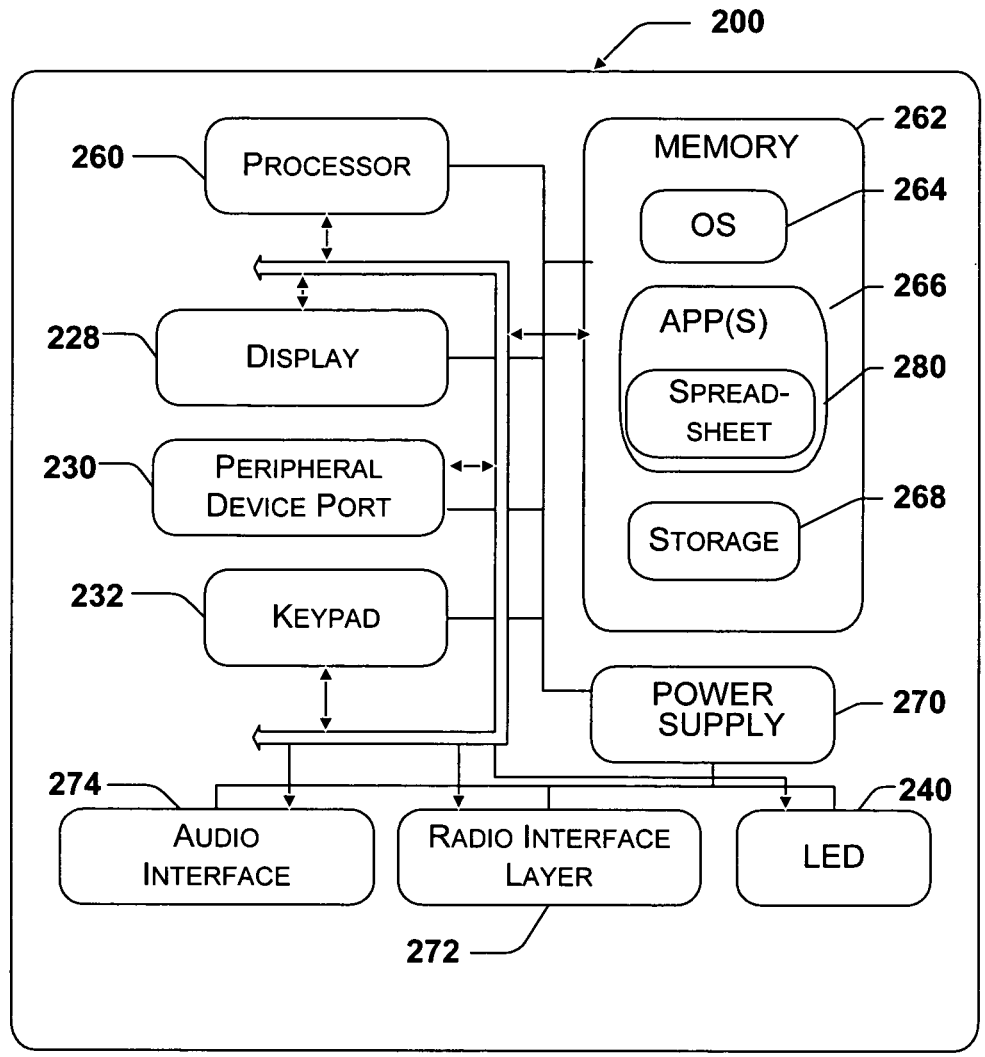
FIG. 2 illustrates an exemplary mobile device that may be used in one exemplary embodiment of the present invention.

FIG. 2 illustrates a mobile computing device that may be used in one exemplary embodiment of the present invention. With reference to FIG. 2, one exemplary system for implementing the invention includes a mobile computing device, such as mobile computing device 200. The mobile computing device 200 has a processor 260, a memory 262, a display 228, and a keypad 232. The memory 262 generally includes both volatile memory (e.g., RAM) and non-volatile memory (e.g., ROM, Flash Memory, or the like). The mobile computing device 200 includes an operating system 264, such as the Windows CE operating system from Microsoft Corporation or other operating system, which is resident in the memory 262 and executes on the processor 260. The keypad 232 may be a push button numeric dialing pad (such as on a typical telephone), a multi-key keyboard (such as a conventional keyboard). The display 228 may be a liquid crystal display, or any other type of display commonly used in mobile computing devices. The display 228 may be touch-sensitive, and would then also act as an input device.

One or more application programs 266 are loaded into memory 262 and run on the operating system 264. Examples of application programs include phone dialer programs, email programs, scheduling programs, PIM (personal information management) programs, word processing programs, spreadsheet programs, Internet browser programs, and so forth. In one embodiment, applications 266 further include a cell formatting application that, in combination with the other portions of computing device 100, provides the functionality of the present invention.

The mobile computing device 200 also includes non-volatile storage 268 within the memory 262. The non-volatile storage 268 may be used to store persistent information which should not be lost if the mobile computing device 200 is powered down. The applications 266 may use and store information in the storage 268, such as e-mail or other messages used by an e-mail application, contact information used by a PIM, appointment information used by a scheduling program, documents used by a word processing application, and the like.

The mobile computing device 200 has a power supply 270, which may be implemented as one or more batteries. The power supply 270 might further include an external power source, such as an AC adapter or a powered docking cradle that supplements or recharges the batteries.

The mobile computing device 200 is shown with two types of external notification mechanisms: an LED 240 and an audio interface 274. These devices may be directly coupled to the power supply 270 so that when activated, they remain on for a duration dictated by the notification mechanism even though the processor 260 and other components might shut down to conserve battery power. The LED 240 may be programmed to remain on indefinitely until the user takes action to indicate the powered-on status of the device. The audio interface 274 is used to provide audible signals to and receive audible signals from the user. For example, the audio interface 274 may be coupled to a speaker for providing audible output and to a microphone for receiving audible input, such as to facilitate a telephone conversation.

The mobile computing device 200 also includes a radio interface layer 272 that performs the function of transmitting and receiving communications, such as radio frequency communications. The radio interface layer 272 facilitates wireless connectivity between the mobile computing device 200 and the outside world, via a communications carrier or service provider. Transmissions to and from the radio interface layer 272 are conducted under control of the operating system 264. In other words, communications received by the radio interface layer 272 may be disseminated to application programs 266 via the operating system 264, and vice versa.

Figure 3:
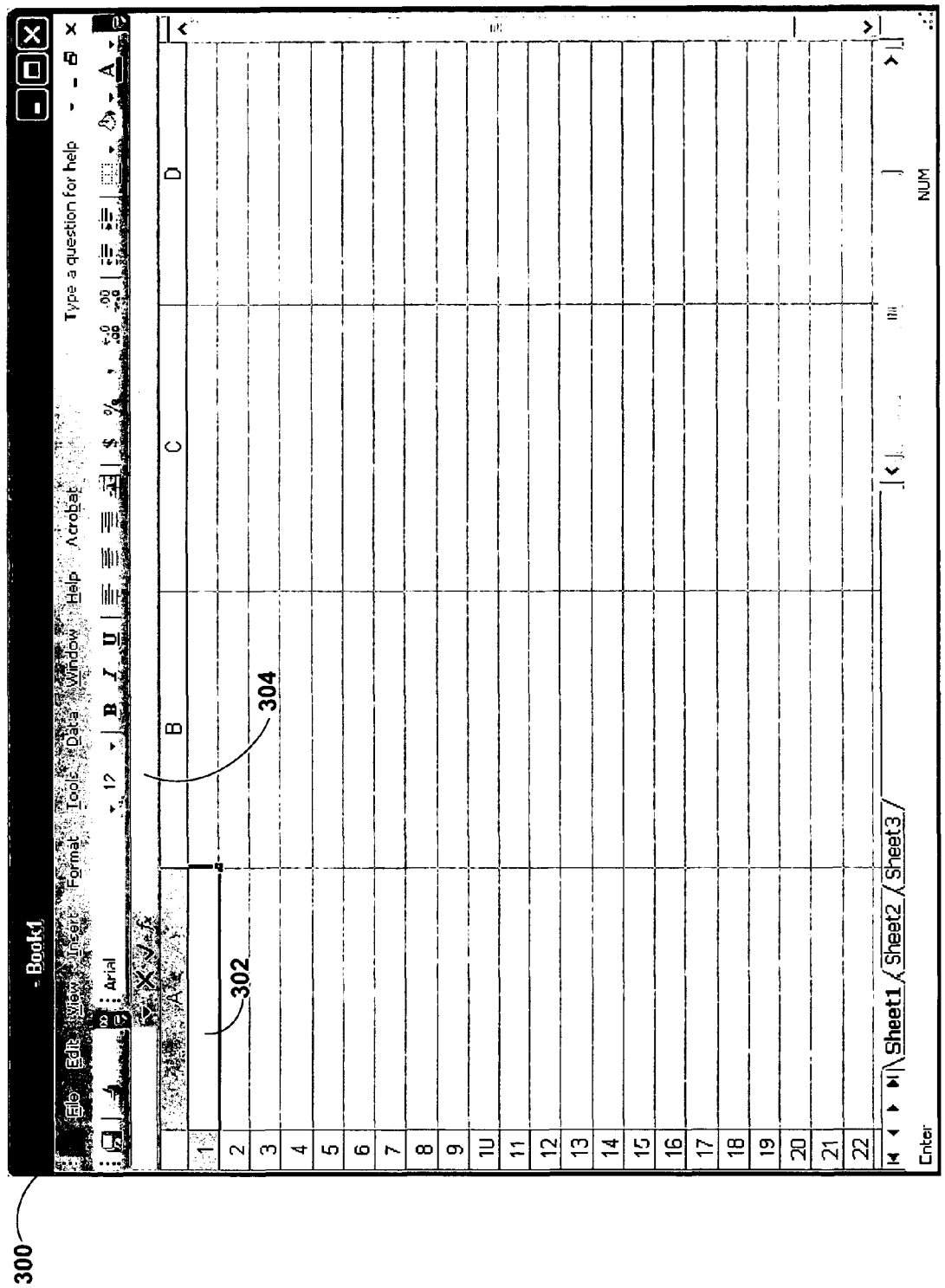
FIG. 3 illustrates an exemplary spreadsheet user interface that may be used in one exemplary embodiment of the present invention.

Illustrative Embodiments for a Spreadsheet Application Supporting Diverse Functions FIG. 3 illustrates an exemplary spreadsheet user interface that may be used in one exemplary embodiment of the present invention. The spreadsheet 300 may be any type of spreadsheet used to calculate and keep track of data. The spreadsheet 300 may include one or more formulaic cells 302. The formulaic cells 302 may be configured to receive formulas, equations, numbers, letters, symbols, words, formulaic cell dependencies or any other data forms that are conducive to a spreadsheet. The formulaic cell 302 may be defined as a cell that is configured to allow one or more dependencies. A dependency may be defined as any type of formulaic data. Such dependencies may include a formula dependency, a spreadsheet function dependency, a defined name dependency, a list dependency, a pivot dependency, a user defined function dependency, an enumerated argument dependency, a sheet data dependency, a date object dependency or other dependencies. The spreadsheet 300 may also include a formula field 304 for allowing a user to more readily access and manipulate formulas and data included the formulaic cells (e.g., 302). In one embodiment, formula field 304 illustrates the data in a formulaic cell or the function used for producing the data in formulaic cell 302.

In one embodiment, the functions provided in accordance with spreadsheet 300 are provided by a call to a function library or similar database (not shown). The function library provides the code for implementing the function in correlation with the cells of spreadsheet 300.

Even though the present invention is taught in conjunction with a spreadsheet 300, it is contemplated that the present invention could be implemented with any application or program having a formulaic cell 302. The spreadsheet 300 is merely taught herein for exemplary and descriptive purposes and should not be considered limiting. For example, certain functions provided in accordance with the present invention may be used in conjunction with a calculator application where the calculator has a single formulaic cell. Accounting applications, business applications, and banking applications that have formulaic cells are also contemplated.

Examples Of The Functions Supported By The Present Invention

Figure 4:
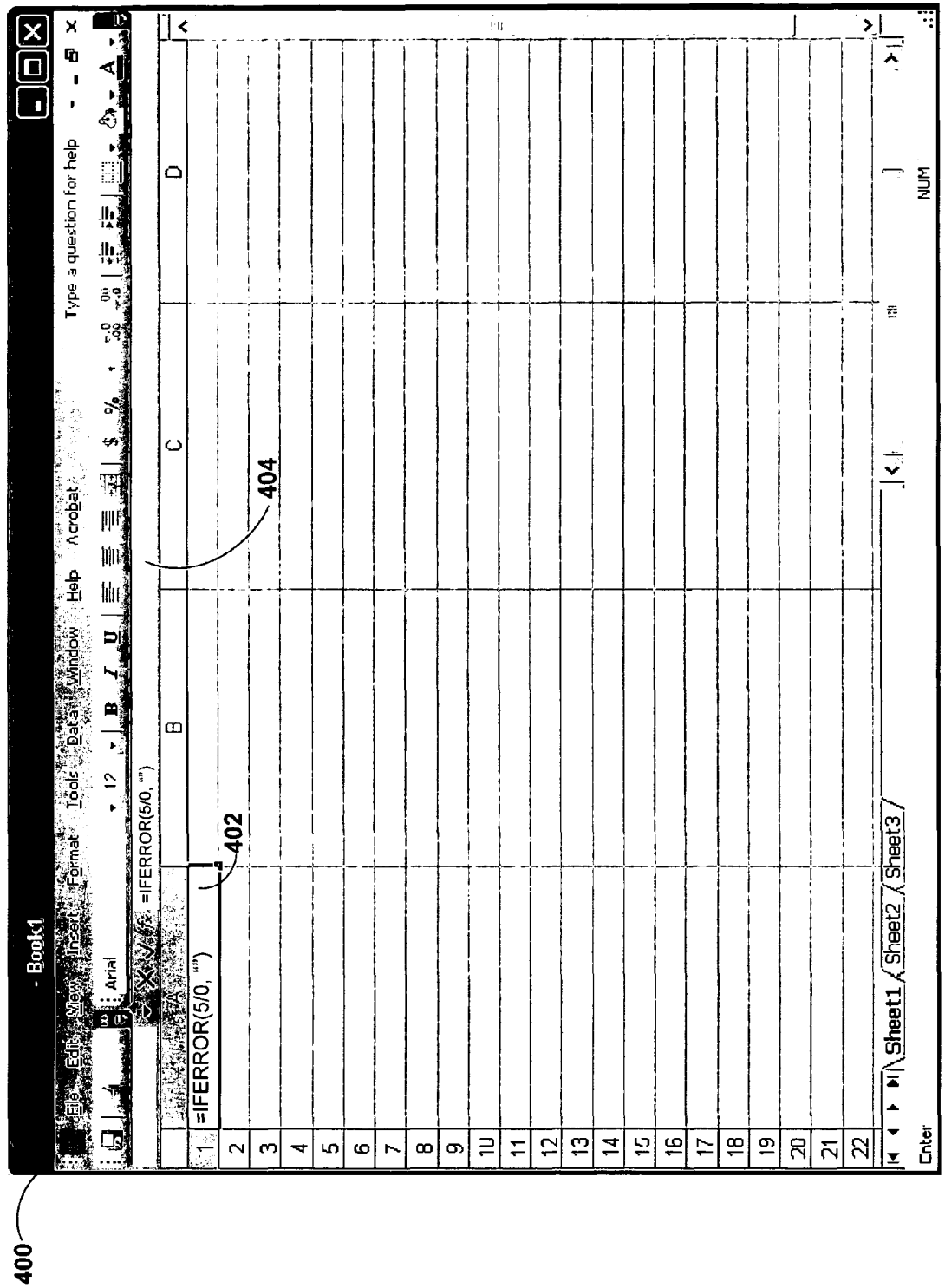
FIG. 4 illustrates a spreadsheet document including a first automatically supplied function in accordance with the present invention.

FIG. 4 illustrates a spreadsheet document including a first automatically supplied function in accordance with the present invention. Spreadsheet document 400 shows an example of a function referred to herein as the IFERROR function. An example entry of the NONERROR function is illustrated within formulaic cell 402 and formula field 404. The example shown returns a value of ("") corresponding to the empty string.

This function provides a method for catching and handling errors in formulas. If the expression does not evaluate to an error, it is returned. If the formula does evaluate to an error, the specified return value is returned instead. The syntax for the IFERROR function is described according to the following:

$$\text{IFERROR(expression, value if error [,error type1][, error type2 ... ])} \quad (1)$$

"Expression" refers to the argument that is checked for an error. "Value if error" refers to the value to return if the expression evaluates to an error. "Error type 1 ... n" refers to optional arguments to specify the error types to catch. If one or more is specified, the "value if error" is returned only if the expression is an error of one of the types specified. Any other error is simply returned. The error types used in combination with the IFERROR function include, but are not limited to, #NULL!, #DIV/0!, #VALUE!, #REF!, #NAME?, #NUM!, and #N/A. Furthermore, the use of the IFERROR function may be nested in a formulaic cell for returning multiple error messages when an expression is evaluated to an error. In one embodiment, the concept of nesting is also applicable to the other functions enumerated below in accordance with the present invention. The IFERROR function is not limited to the examples or syntax shown, and other syntax for the function may be used in conjunction with different parameters and arguments to produce similar results.

Figure 5:
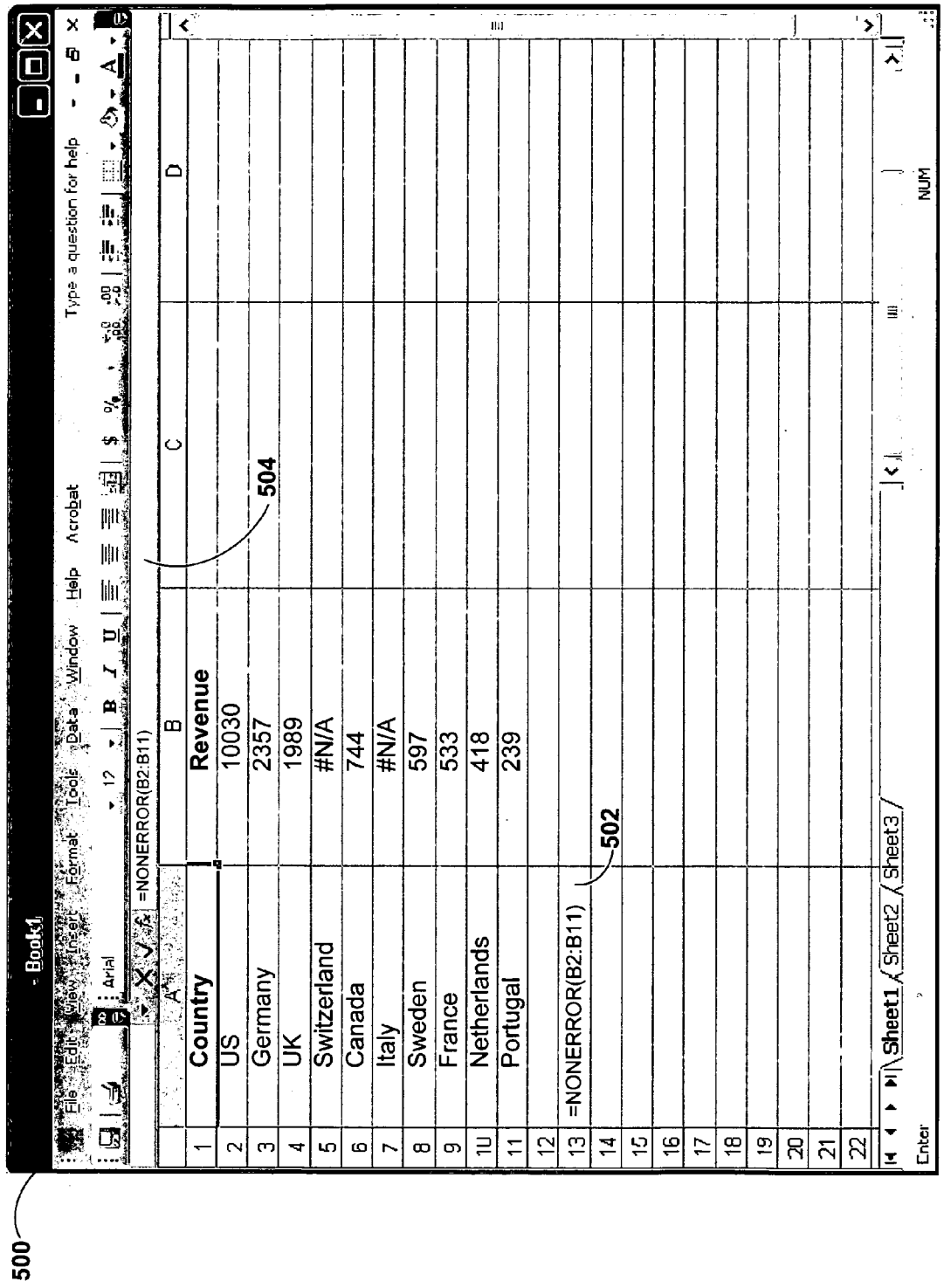
FIG. 5 illustrates a spreadsheet document including another automatically supplied function in accordance with the present invention.

FIG. 5 illustrates a spreadsheet document including another automatically supplied function in accordance with the present invention. Spreadsheet document 500 shows an example of a function referred to herein as the NONERROR function. An example entry of the NONERROR function is illustrated within formulaic cell 502 and formula field 504.

The NONERROR function provides a method for determining the results in a range that do not correspond to an error. Only the values of the formulaic cells in the range that do not correspond to an error are returned by the NONERROR function. The syntax for the NONERROR function is described according to the following:

NONERROR(range) (2)

"Range" refers to a one dimensional (horizontal or vertical) range. In one embodiment, if "range" is a two-dimensional array, the function returns an error result corresponding #VALUE!.

The example shown illustrates revenue figures for various countries. Entry of the exemplary NONERROR function shown returns a result of (10030;2357;1989;744;597; 533; 418;239). The result corresponds to the formulaic cells within the range that do not have an associated error result (i.e., excluding cell B5). In one embodiment, the results are returned in an array of the same orientation as the range and containing the values from the range excluding those that evaluate to an error. However, the NONERROR function is not limited to the examples or syntax shown, and other syntax for the function may be used in conjunction with different parameters and arguments to produce similar results.

FIG. 6 illustrates a spreadsheet document including another automatically supplied function in accordance with the present invention. Spreadsheet document 600 shows an example of a function referred to herein as the TABLELOOKUP function. An example entry of the TABLELOOKUP function is illustrated within formulaic cell 602 and formula field 604.

The TABLELOOKUP function provides a method for looking up values in two dimensions. In one embodiment, the syntax for the TABLELOOKUP function is described according to the following:

TABLELOOKUP (Vertical Lookup Value, Horizontal Lookup Value, Table Array, [Nearest/Exact]) (3)

"Vertical Lookup Value" refers to the value to match in the left-most column. "Horizontal Lookup Value" refers the value to match in the upper-most row. "Table Array" refers to the range to search. "Nearest/Exact" refers to an enumeration to specify whether to do a nearest match lookup or an exact lookup. For example, the enumerations may correspond to the responses provided according to the following table:

TABLE 1

| Code | Value | Description |
|---|---|---|
| 0, FALSE or omitted | Exact matches | The Vertical Lookup Value and Horizontal Lookup Value must be exact matches. If no exact match is found, the function returns #N/A error value. |
| 1 or | Nearest | Vertical Lookup Value and Horizontal Lookup |

TABLE 1-continued

| Code | Value | Description |
|---|---|---|
| TRUE | matches | Value are nearest matches and assume that the upper-most row and left-most column are sorted ascending. If an exact match is not found, the largest value that is less than the lookup value is used. If the first value in the upper-most row or left-most column is greater than the corresponding lookup value, returns #N/A. |
| 2 | Nearest match vertical | Finds the nearest match for Vertical Lookup Value and an exact match for Horizontal Lookup Value. If the first value in the left-most column is greater than Vertical Lookup Value, returns #N/A. |
| 3 | Nearest match horizontal | Finds the nearest match for Horizontal Lookup Value and an exact match for Vertical Lookup Value. If the first value in the upper-most row is greater than Horizontal Lookup Value, returns #N/A. |

In one embodiment, if the TABLELOOKUP function can't find Vertical Lookup Value or Horizontal Lookup Value, TABLELOOKUP returns the #N/A error value. In another embodiment, the TABLELOOKUP function uses exact matches by default. Additionally, TABLELOOKUP may be configured to handle wildcards ('*' and '?') within text values for the Vertical Lookup Value or Horizontal Lookup Value arguments. Also, if Nearest or Exact is not one of the code values listed below, the TABLELOOKUP function returns a #VALUE! error, or if Nearest or Exact refers to an empty cell, the TABLELOOKUP function returns #VALUE!. In an additional embodiment, if Table Array refers to an entirely empty range of cells, the TABLELOOKUP function returns a #N/A error. Additionally, if Vertical Lookup Value, Horizontal Lookup Value, or Nearest or Exact value is an error, the function returns that error.

The example shown illustrates machine usage for a group of users on specified dates. Entry of the exemplary TABLELOOKUP function shown returns a result of #N/A because Jan 4 is not in the left-most column. However, the TABLELOOKUP function is not limited to the examples or syntax shown, and other syntax for the function may be used in conjunction with different parameters and arguments to produce similar results.

FIG. 7 illustrates a spreadsheet document including another automatically supplied function in accordance with the present invention. Spreadsheet document 700 shows an example of a pair of functions referred to herein as the VLOOKUPMULTIPLE and HLOOKUPMULTIPLE functions. An example entry of the VLOOKUPMULTIPLE function is illustrated within formulaic cell 702 and formula field 704, and an example entry of the HLOOKUPMULTIPLE function is illustrated in formulaic cell 706.

The VLOOKUPMULTIPLE and HLOOKUPMULTIPLE functions allow a user to specify the return row or column that may be located to the left or right of the lookup row or column respectively. These functions also allow a selection of a set of multiple lookup rows and columns for matching the values used as variables in the function.

In one embodiment, the syntax for the VLOOKUPMULTIPLE function is described according to the following:

VLOOKUPMULTIPLE(table array, result column, lookup value 1, lookup column 1 [, lookup value 2, lookup column 2] . . . ) (4)

In a further embodiment, the syntax for the HLOOKUPMULTIPLE function is described according to the following:

HLOOKUPMULTIPLE(table array, result row, lookup
value 1, lookup row 1 [,lookup value 2, lookup
row 2]...)    (5)

In expressions (4) and (5), "table array" refers to the range to search. "Result column" refers to the column number in table array from which the matching value is returned. For example, a column number of 1 returns the value in the first column in table array. "Result row" refers to the row number in table array from which the matching value is returned. For example, a row number of 1 returns the value in the first row in table array. "Lookup value 1, 2, etc." refers to the value to match in the corresponding lookup column or row depending on the function used. "Lookup column 1, 2, etc." refers to the column number in table array in which to match the corresponding lookup value when the VLOOKUPMULTIPLE function is used. "Lookup row 1, 2, etc." refers to the row number in table array in which to match the corresponding lookup value when the HLOOKUPMULTIPLE function is used.

In one embodiment, if the VLOOKUPMULTIPLE or HLOOKUPMULTIPLE functions are unable to find matches for each lookup column or lookup row respectively, the function returns a #N/A error value. In another embodiment, the VLOOKUPMULTIPLE and HLOOKUPMULTIPLE functions are configured to handle wildcards ('*' and '?') within text values for the lookup value arguments.

The example shown illustrates populations for specified cities located in specified states. Entry of the exemplary VLOOKUPMULTIPLE function shown returns a result of 52000 from the third column. Entry of the exemplary HLOOKUPMULTIPLE function shown returns a result of 4562 from the third row. However, both the VLOOKUPMULTIPLE and HLOOKUPMULTIPLE functions are not limited to the examples shown, and other results and arguments may be used.

Figure 8:
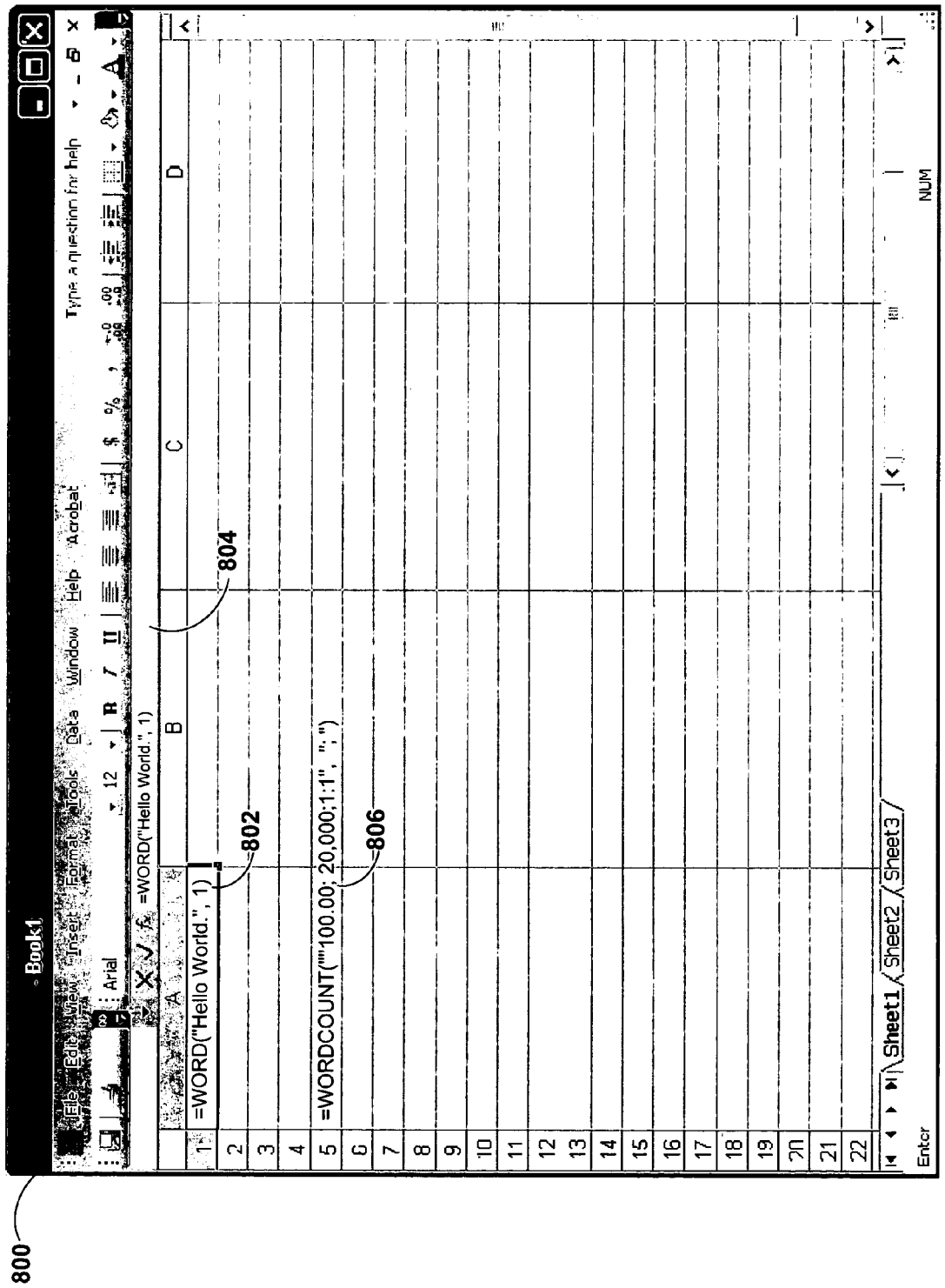
FIG. 8 illustrates a spreadsheet document including another automatically supplied function in accordance with the present invention.

FIG. 8 illustrates a spreadsheet document including another automatically supplied function in accordance with the present invention. Spreadsheet document 800 shows an example of a pair of functions referred to herein as the WORD and WORDCOUNT functions. An example entry of the WORD function is illustrated within formulaic cell 802 and formula field 804, and an example entry of the WORDCOUNT function is illustrated in formulaic cell 806.

The WORD and WORDCOUNT functions parse pieces of text out of a longer text string by tokenizing the string according to either a set of built-in or user-defined delimiters. The WORD function returns the tokens and the WORDCOUNT function returns the number of tokens.

In one embodiment, the syntax for the WORD function is described according to the following:

WORD(Text, Word Position, [delimiter 1,][delimiter
2...])    (6)

In a further embodiment, the syntax for the WORD-COUNT function is described according to the following:

WORDCOUNT(text, [delimiter 1, ][delimiter 2, ...])    (7)

In expressions (6) and (7), "text" refers to the text string from which to extract the word. "Word position" refers to an integer specifying the number of the word to be returned. For example, for the first word, the word position is a 1. The word position parameter may be an array of integers to specify multiple words to return. In one embodiment, if the word position parameter is an array, the words are returned as an array of the same dimensions. "Delimiter 1, 2, etc." refers to specified text strings to be used as the delimiters between words in the target text string. For example, a delimiter may correspond to a space in the text string. In other embodiments, the delimiters may include a line break, comma, period, exclamation mark, question mark, semicolon, colon, or other indicators of the separation between words in a text string.

In one embodiment, if word position is beyond the number of words found, the WORD function returns the empty string. In another embodiment, if word position is less than 1, the WORD function returns a #VALUE error. In yet another embodiment, if the delimiter is an empty string, the WORD and WORDCOUNT functions ignore it. However, if no other delimiter is provided, the WORD and WORDCOUNT functions return a #VALUE! error.

The example shown illustrates an example entry of the WORD and WORDCOUNT functions. Entry of the exemplary WORD function returns a result of the string "Hello" corresponding to the first word. Entry of the exemplary WORDCOUNT function returns a resulting word count of 2 using the colon as the designated delimiter. However, both the WORD and WORDCOUNT functions are not limited to the examples shown, and other results and arguments may be used.

FIG. 9 illustrates a spreadsheet document including another automatically supplied function in accordance with the present invention. Spreadsheet document 900 shows an example of a function referred to herein as the CONCATENATERANGE function. An example entry of the CONCATENATERANGE function is illustrated within formulaic cell 902 and formula field 904.

The CONCATENATERANGE function operates to concatenate strings of text over a range of formulaic cells and insert a text string in-between the strings in the range(s). The syntax for the CONCATENATERANGE function is described according to the following:

CONCATENATERANGE(Separator, Text1, [Text2],
[Text3]...)    (8)

In expression (8), "separator" refers to a string to be included between the text arguments. In one embodiment, this string may be the empty string. "Text1, Text2, etc." refers to one or more items to concatenate. Text parameters may be an array or range of formulaic cells. In one embodiment, if a text parameter is multi-dimensional, the items are concatenated in the default order in which the spreadsheet application goes through the items in an array (e.g., across rows first and then down columns).

The example shown illustrates revenue figures for various countries. Entry of the exemplary CONCATENATERANGE function shown returns a result of "US, Germany, UK, Switzerland". The result corresponds to the concatenation of the contents of cells A2 through A5 with a "," in between each pair of elements. However, the CONCATENATERANGE function is not limited to the examples or syntax shown, and other syntax for the function may be used in conjunction with different parameters and arguments to produce similar results.

Figure 10:
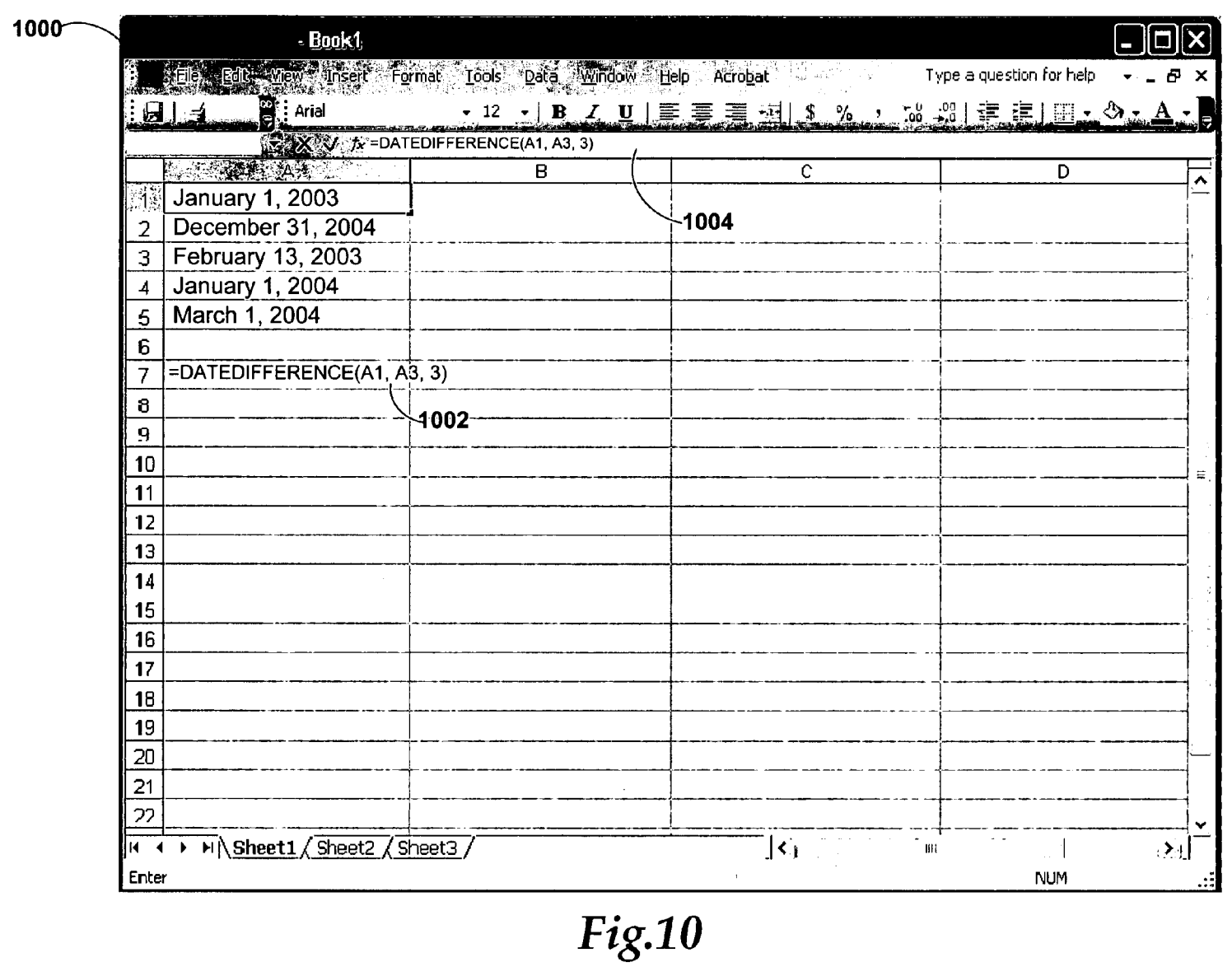

FIG. 10 illustrates a spreadsheet document including another automatically supplied function in accordance with the present invention. Spreadsheet document 1000 shows an example of a function referred to herein as the DATEDIFFERENCE function. An example entry of the DATEDIFFERENCE function is illustrated within formulaic cell 1002 and formula field 1004.

The DATEDIFFERENCE function operates to calculate the number of days, months or years between two dates entered into formulaic cells of a spreadsheet document. The syntax for the DATEDIFFERENCE function is described according to the following:

DATEDIFFERENCE(Start Date, End Date, Units)    (9)

In expression (9), "Start Date" refers to the first date used for determining the difference between two calendar dates. "End Date" refers to the second of the two dates for determining the difference. In one embodiment, if start date comes after end date, the answer will be a negative number. "Units" refers to an integer representing one of the following codes:

TABLE 2

| Code | Units | Description |
|---|---|---|
| 1 | Years | The number of complete years between Start Date and End Date. |
| 2 | Months | The number of complete months between Start Date and End Date. |
| 3 | Days | The number of complete days between Start Date and End Date. |
| 4 | Days ignoring start month and year | Difference in days if both dates were in the month and year of the End Date |
| 5 | Days ignoring end month and year | Difference in days if both date were in the month and year of the Start Date |
| 6 | Days ignoring start year | Difference in days if both dates were in the year of End Date |
| 7 | Days ignoring end year | Difference in days if both dates were in the year of Start Date |
| 8 | Difference in months ignoring the days and years | Difference in months ignoring the days and years |

The example shown in FIG. 10 illustrates various calendar dates. Entry of the exemplary DATEDIFFERENCE function shown returns a result of "42". The result corresponds to the calculation of days (e.g., code 3) between the date in cell A1 and the date in cell A3. However, the DATEDIFFERENCE function is not limited to the examples or syntax shown, and other syntax for the function may be used in conjunction with different parameters and arguments to produce similar results.

Figure 11:
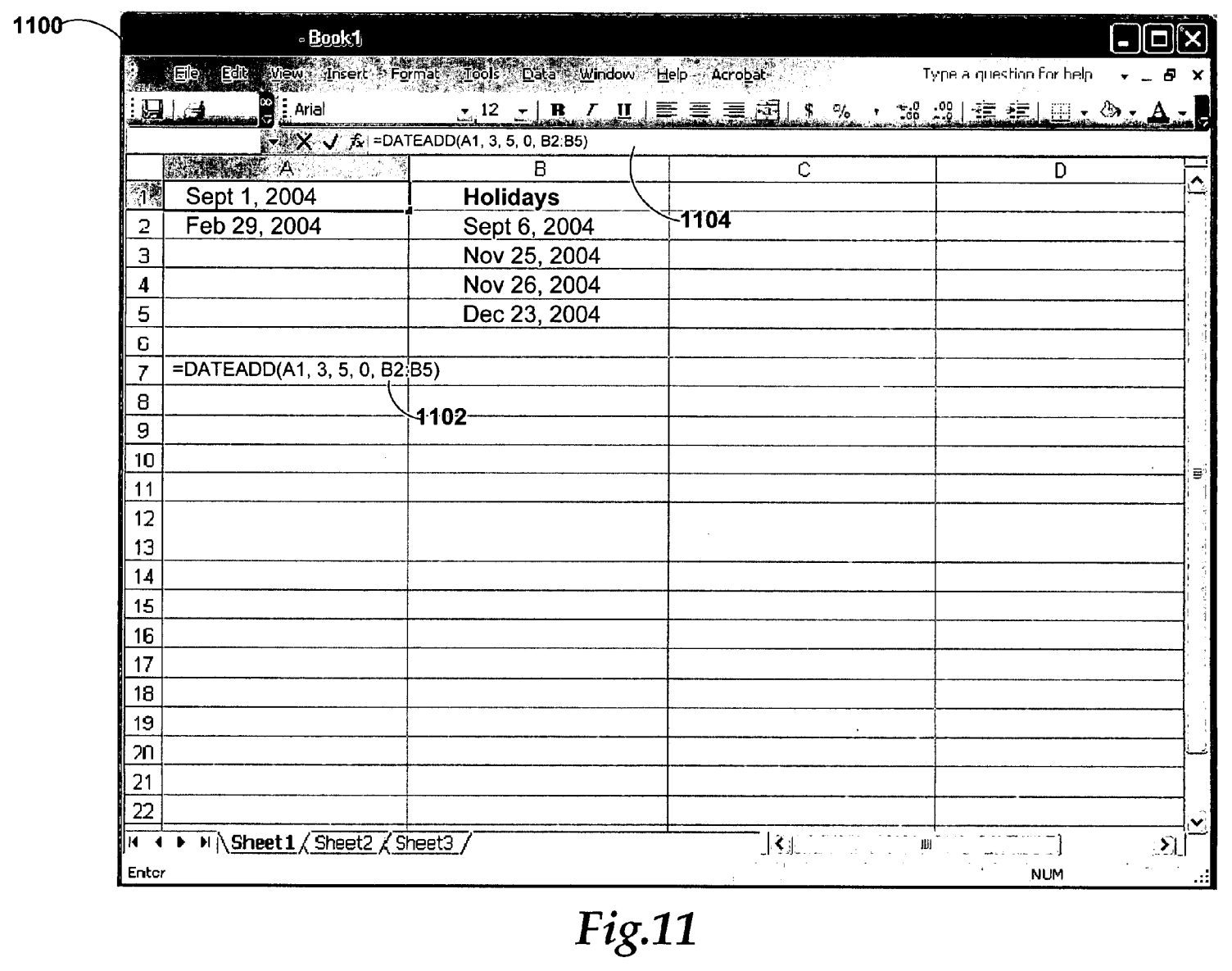

FIG. 11 illustrates a spreadsheet document including another automatically supplied function in accordance with the present invention. Spreadsheet document 1100 shows an example of a function referred to herein as the DATEADD function. An example entry of the DATEADD function is illustrated within formulaic cell 1102 and formula field 1104.

The DATEADD function allows a user to specify a date, and specify the number of days, months or years for incrementing that date. The function also allows the user to specify if the resulting date should not fall on a particular set of dates or days of the week (e.g., weekend days). The syntax for the DATEADD function is described according to the following:

DATEADD(Start Date, Number, Units, [Skip Weekends], [Holidays])　　(10)

In expression (10), "Start Date" refers to the date from which to increment. "Number" refers to the number of the specified units to add to the start date. In one embodiment, the number may be negative. A negative number returns a date before the start date. "Units" refers to an integer that indicates a chronological unit of measure and corresponds to one of the following codes:

TABLE 3

| Code | Units |
|---|---|
| 1 | Years |
| 2 | Months |
| 3 | Days |

"Exclude Weekends" refers to another enumerated value. The exclude weekends parameter specifies whether to skip weekends and which days to count as weekends. If excluding weekends and the start date plus the specified number of days/months/years would land on a weekend, the DATEADD function returns the next non-weekend date. When weekends are skipped and the unit is specifies as Days, weekends are not counted in the days either. The exclude weekends parameter corresponds to one of the following codes:

TABLE 4

| Code | Effect |
|---|---|
| 0 | Don't skip [Default value] |
| 1 | Skip Saturday and Sunday |
| 2 | Skip Friday and Saturday |
| 3 | Skip Thursday and Friday |
| 4 | Skip Friday |
| 5 | Skip Saturday |
| 6 | Skip Sunday |

"Holidays" refers to a true/ false statement that includes or excludes an optional set of serial dates from the working calendar. The holidays parameter may be either a range of cells containing the dates or an array constant of serial dates. If the start date plus the specified number of units lands on a holiday, and the holidays parameter is set to exclude the set of dates, the next non-holiday date is returned. When the units is days, holidays are not counted. In one embodiment, if a holiday is not specified, no holidays are used.

The example shown in FIG. 11 illustrates various calendar dates and various holidays. Entry of the exemplary DATEADD function shown returns a result of Sep. 7, 2004 because Sep. 6, 2004 is a holiday. However, the DATEADD function is not limited to the examples or syntax shown, and other syntax for the function may be used in conjunction with different parameters and arguments to produce similar results.

Figure 12:
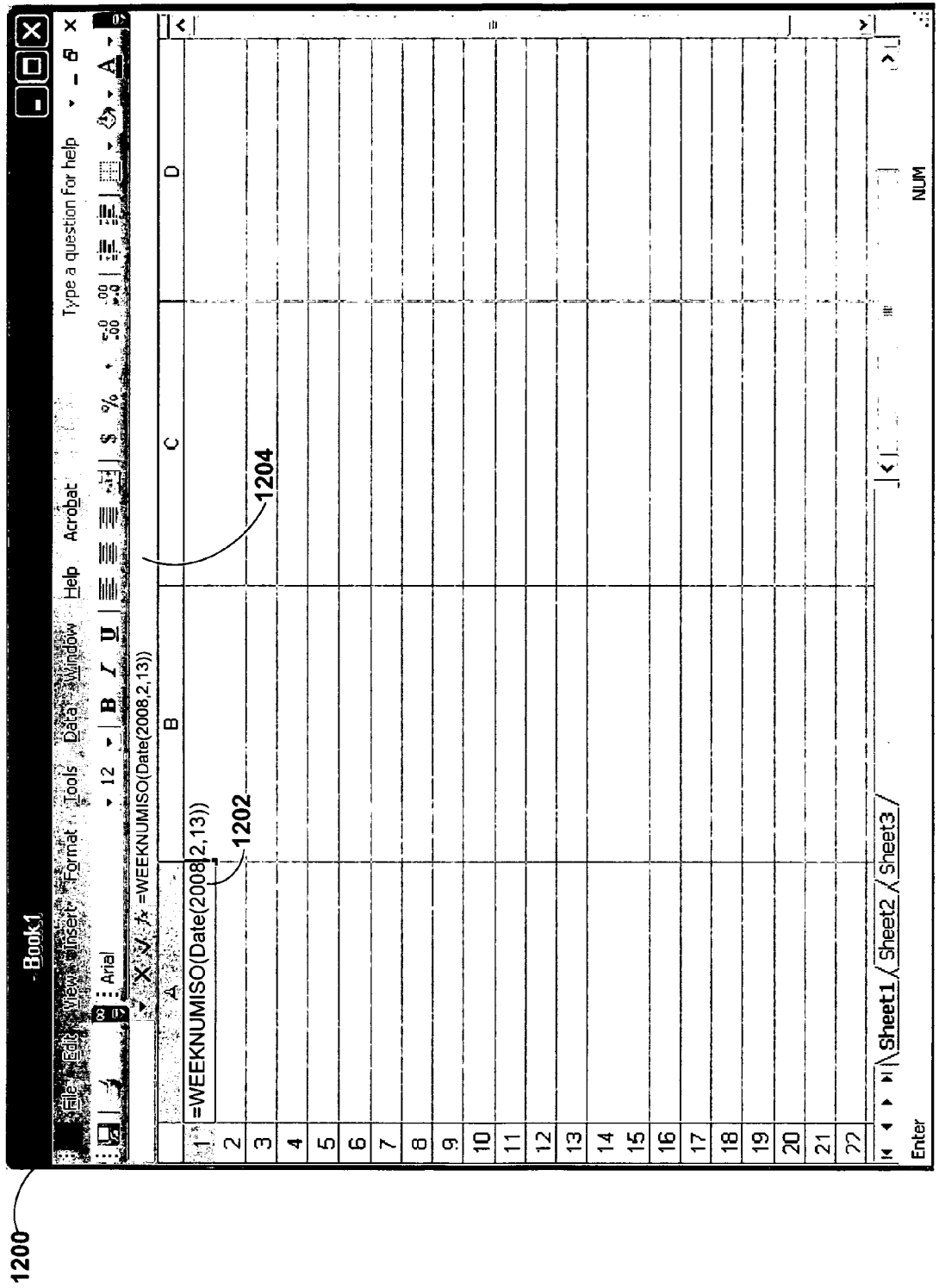
FIG. 12 illustrates a spreadsheet document including another automatically supplied function in accordance with the present invention.

FIG. 12 illustrates a spreadsheet document including another automatically supplied function in accordance with the present invention. Spreadsheet document 1200 shows an example of a function referred to herein as the WEEKNUMISO function. An example entry of the WEEKNUMISO function is illustrated within formulaic cell 1202 and formula field 1204.

The WEEKNUMISO function operates to increment the weeks of the calendar year in accordance with the ISO (International Organization for Standardization) standard. In commercial and industrial applications (delivery times, production plans, etc.), especially in Europe, it is often required to refer to a week of a year. By ISO standards, Week 01 of a year is the first week that has the Thursday in this year, which is equivalent to the week that contains the fourth day of January. In other words, the first week of a new year is the week that has the majority of its days in the new year. Week 01 might also contain days from the previous year and the week before week 01 of a year is the last week (52 or 53) of the previous year even if it contains days from the new year. A week starts with Monday (day 1) and ends with Sunday (day 7). For example, the first week of the year 1997 lasts from 1996-12-30 to 1997-01-05.

The syntax for the WEEKNUMISO function is described according to the following:

WEEKNUMISO(date)　　(11)

Wherein "date" refers to Date the serial date of the day from which to get the week number.

The example shown in FIG. 12 illustrates an exemplary entry of the WEEKNUMISO function. The WEEKNUMISO function shown returns a result of 7. The ISO Week Date for 13 Feb. 2008 is: 2008-W07-3. It is week 07 of year 2008, day 3 of the week, and day 44 of the year. However, the WEEKNUMISO function is not limited to the examples or syntax shown, and other syntax for the function may be used in conjunction with different parameters and arguments to produce similar results.

Figure 13:
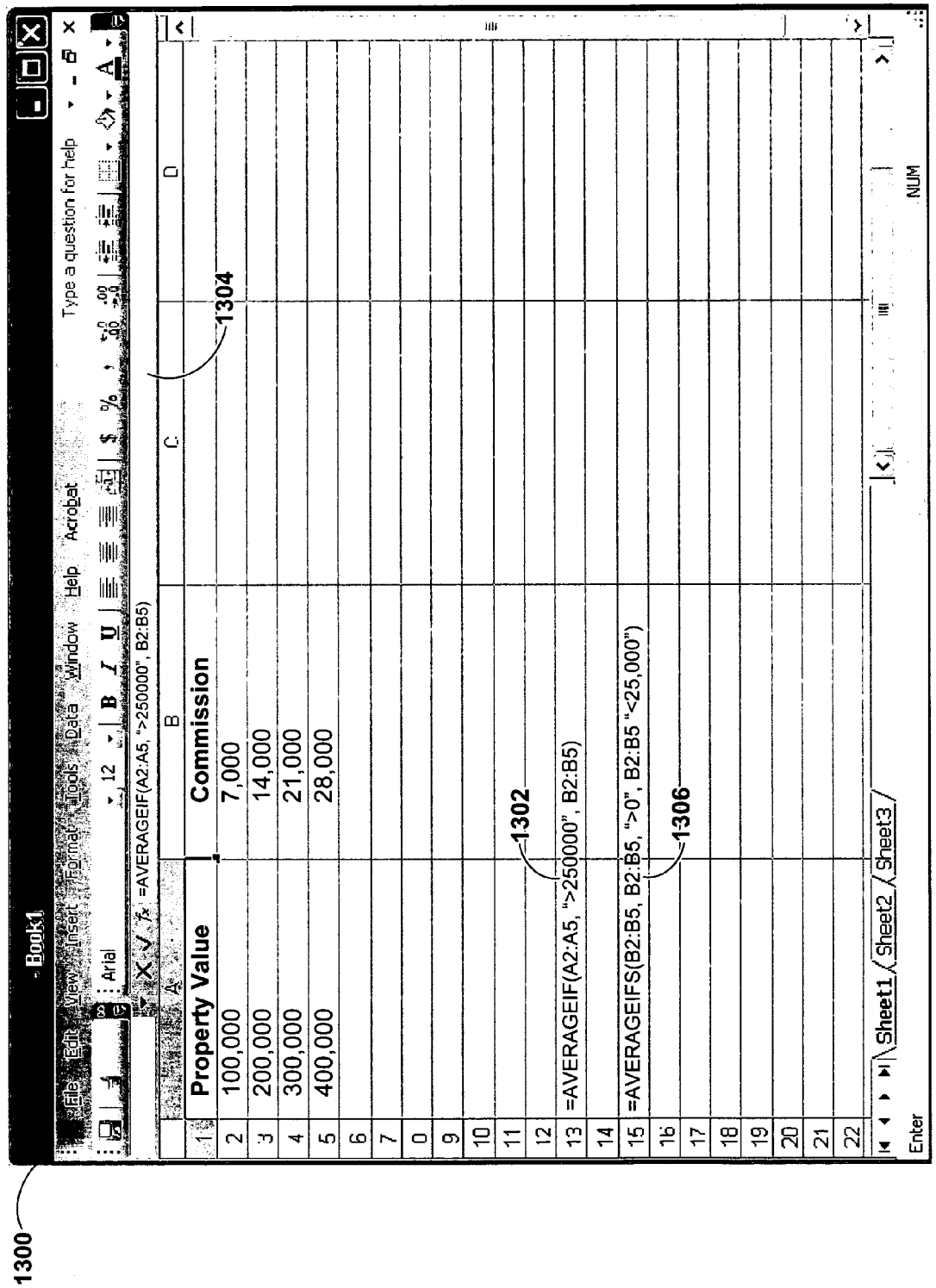
FIG. 13 illustrates a spreadsheet document including another automatically supplied function in accordance with the present invention.

FIG. 13 illustrates a spreadsheet document including another automatically supplied function in accordance with the present invention. Spreadsheet document 1300 shows an example of a pair of functions referred to herein as the AVERAGEIF and AVERAGEIFS functions. An example entry of the AVERAGEIF function is illustrated within formulaic cell 1302 and formula field 1304, and an example entry of the AVERAGEIFS function is illustrated in formulaic cell 1306.

The AVERAGEIF function averages formulaic cells within a range of formulaic cells that satisfy a given criteria. The AVERAGEIFS function averages formulaic cells within a range of formulaic cells that satisfy multiple criteria. In one embodiment, the syntax for the AVERAGEIF function is described according to the following:

$$\text{AVERAGEIF(Range, Criteria, [Average Range])} \quad (12)$$

For expression (12), "range" refers to the set of formulaic cells to evaluate with the criteria. "Criteria" refers to a criterion in the form of a number, expression, or text that defines which cells are averaged. For example, criteria can be expressed as 32, "32", ">32", "apples", or any other form of expression upon which the range of cells may be evaluated. "Average range" refers to the actual set of formulaic cells to average. In one embodiment, if the average range parameter is omitted, the range parameter is used.

In another embodiment, the syntax for the AVERAGEIFS function is described according to the following:

$$\text{AVERAGEIFS(Average Range, criteria\_range1, criteria1 [,criteria\_range2, criteria2])} \quad (13)$$

For expression (13), "average range" refers to the range of formulaic cells to average. "Criteria_range1, 2, etc." refers to the range in which to evaluate the associated criteria. "Criteria1, 2, etc." refers to the criteria in the form of a number expression or text that defines which cells to average. For example, criteria can be expressed as 32, "32", ">32", "apples". The cells in the defined average range are averaged if all of the criteria specified are true for the cells.

The example shown illustrates an example of commissions for various house prices. Entry of the exemplary AVERAGEIF function returns 24,500 as the average of the commissions where the corresponding property value is greater than 250,000. Entry of the exemplary AVERAGEIFS function returns 14,000 as the average of the values in B2-B5 that are between 0 and 25,000. However, both the AVERAGEIF and AVERAGEIFS functions are not limited to the examples shown, and other results and arguments may be used.

Figure 14:
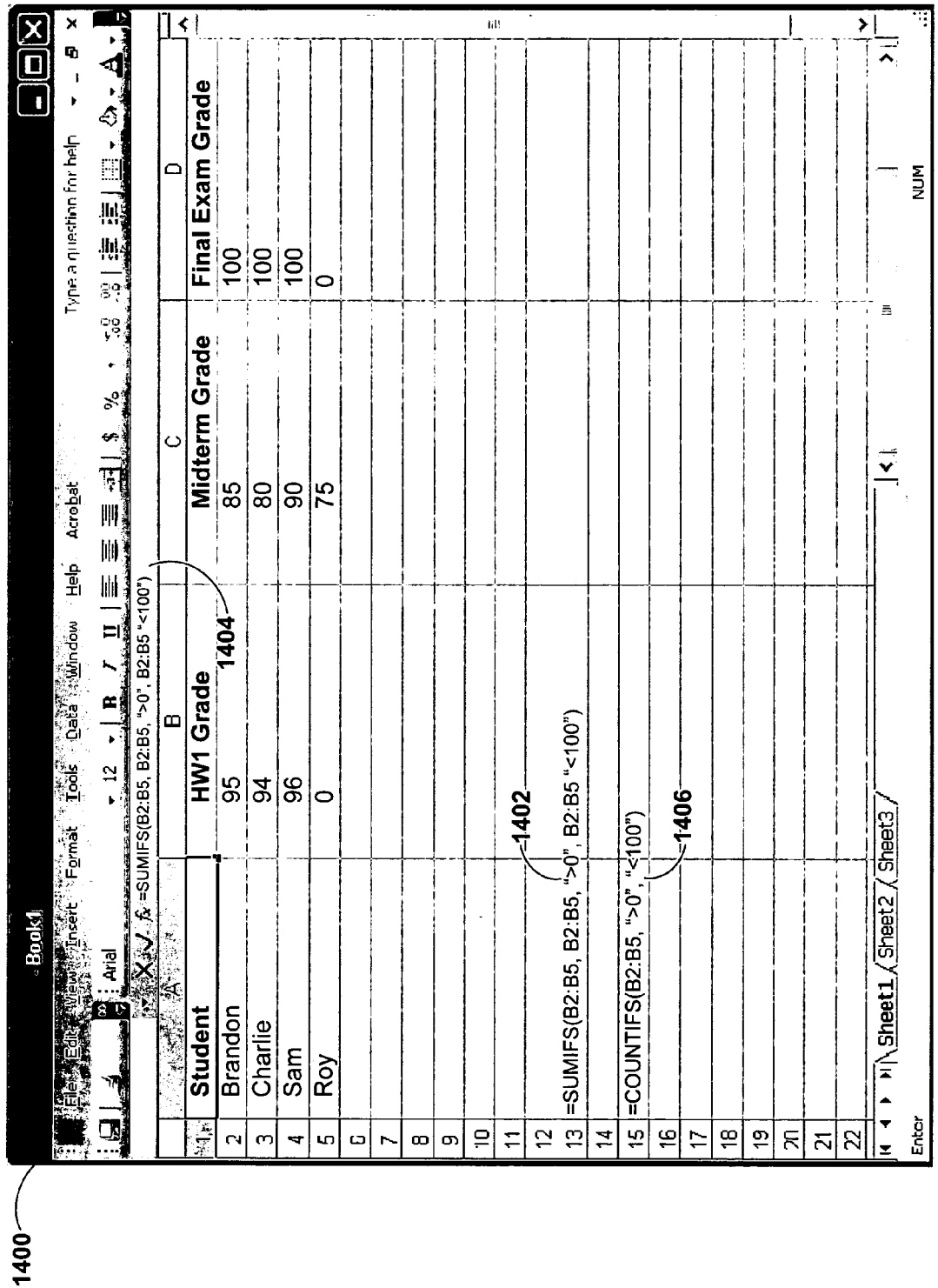
FIG. 14 illustrates a spreadsheet document including another automatically supplied function in accordance with the present invention.

FIG. 14 illustrates a spreadsheet document including another automatically supplied function in accordance with the present invention. Spreadsheet document 1400 shows an example of a pair of functions referred to herein as the SUMIFS and COUNTIFS functions. An example entry of the SUMIFS function is illustrated within formulaic cell 1402 and formula field 1404, and an example entry of the COUNTIFS function is illustrated in formulaic cell 1406.

The SUMIFS and COUNTIFS functions respectively sum and count the formulaic cells in a range of formulaic cells that satisfy multiple user-specified criteria. In one embodiment, the syntax for the AVERAGEIF function is described according to the following:

$$\text{SUMIFS(Sum Range, criteria\_range 1, criteria1 [,criteria\_range2, criteria2])} \quad (14)$$

In another embodiment, the syntax for the AVERAGEIFS function is described according to the following:

$$\text{COUNTIFS(Count Range, criteria1 [,criteria2])} \quad (15)$$

For expressions (14) and (15), "sum range" and "count range" refer to the range of formulaic cells to sum or count respectively. "Criteria_range1, 2, etc." refers to the range in which to evaluate the associated criteria. "Criteria1, 2, etc." refers to the criteria in the form of a number expression or text that defines which cells to add or count. For example, criteria can be expressed as 32, "32", ">32", "apples". The cells in the defined sum range or count range are summed or counted if all of the criteria specified are true for the cells.

The example shown illustrates an example of various grades for a list of students. Entry of the exemplary SUMIF function returns 285 as the sum of the HW1 grades that are between 0 and 100. Entry of the exemplary COUNTIFS function returns 3 as the count of the formulaic cells in B2-B5 that have values between 0 and 100. However, both the SUMIFS and COUNTIFS functions are not limited to the examples shown, and other results and arguments may be used.

FIG. 15 illustrates a spreadsheet document including another automatically supplied function in accordance with the present invention. Spreadsheet document 1500 shows an example of a function referred to herein as the WEIGHTEDAVERAGE function. An example entry of the WEIGHTEDAVERAGE function is illustrated within formulaic cell 1502 and formula field 1504.

The WEIGHTEDAVERAGE function averages the numbers included in formulaic cells within a range of formulaic cells based on a proportional relevance specified by the user. For example, WEIGHTEDAVERAGE(A, W) computes $(A[1]*W[1]+\ldots A[n]*W[n])/(W[1]+\ldots W[n])$ where n is the size of A and W. The syntax for the WEIGHTEDAVERAGE function is described according to the following:

$$\text{WEIGHTEDAVERAGE(range, weights)} \quad (16)$$

In expression (16), "Range" refers to the range of items to average. "Weights" refers to the range of weights that correspond to range.

The example shown in FIG. 15 illustrates various grades and the weights associated with each of the grades. Entry of the exemplary WEIGHTEDAVERAGE function shown returns a result of 84.1 for the weighted average of the grades in B2-B5 based on the weights in C2-C5. However, the WEIGHTEDAVERAGE function is not limited to the examples or syntax shown, and another syntax for the function may be used in conjunction with different parameters and arguments to produce similar results.

FIG. 16 illustrates a spreadsheet document including another automatically supplied function in accordance with the present invention. Spreadsheet document 1600 shows an example of a function referred to herein as the COUNTDISTINCT function. An example entry of the COUNTDISTINCT function is illustrated within formulaic cell 1602 and formula field 1604.

The COUNTDISTINCT function operates to count the number of rows in a range of formulaic cells while counting rows with duplicate data only once. The syntax for the COUNTDISTINCT function is described according to the following:

$$\text{COUNTDISTINCT(range)} \quad (17)$$

In expression (17), "Range" refers to the range of formulaic cells in an array. In one embodiment, if the range contains more than one column, the COUNTDISTINCT function counts the number of distinct rows. Multiple rows that contain the same values in every column are only counted once.

The example shown in FIG. 16 illustrates various primary contacts for number of specifications. Entry of the exemplary COUNTDISTINCT function shown returns a result of 3 since there are 3 distinct primary contacts in cells A2-A6. However, the COUNTDISTINCT function is not limited to the examples or syntax shown, and another syntax for the function may be used in conjunction with different parameters and arguments to produce similar results.

FIG. 17 illustrates a spreadsheet document including another automatically supplied function in accordance with the present invention. Spreadsheet document 1700 shows an example of a function referred to herein as the SORTRANGE function. An example entry of the SORTRANGE function is illustrated within formulaic cell 1702 and formula field 1704.

The SORTRANGE function returns a sorted array of values that are included in formulaic cells, wherein the formulaic cells are included in a range or array of formulaic cells. The syntax for the SORTRANGE function is described according to the following:

SORTRANGE(range, [index number], [ascending], [by column])  (18)

In expression (18), "range" refers to the range or array to sort. "Index number" refers to the row or column to by which to sort. "Ascending" refers to a true/false selection for determining whether to sort in ascending order. "By column" refers to a true/false selection for sorting according to the values in a column or row.

The example shown in FIG. 17 is an example of various grades for a list of students. Entry of the exemplary SORTRANGE function sorts the range according to column A and returns a result of {Brandon,95,85,100;Charlie,94,80,100; Sam,96,90,100; Roy,0,75,0}. However, the SORTRANGE function is not limited to the examples or syntax shown, and another syntax for the function may be used in conjunction with different parameters and arguments to produce similar results.

FIG. 18 illustrates a spreadsheet document including another automatically supplied function in accordance with the present invention. Spreadsheet document 1800 shows an example of a function referred to herein as the DISTINCT function. An example entry of the DISTINCT function is illustrated within formulaic cell 1802 and formula field 1804.

The DISTINCT function takes a set of values arranged in an array of formulaic cells and returns the set of values as a vertical array without any duplication of values. The syntax for the DISTINCT function is described according to the following:

DISTINCT(range)  (19)

In expression (19), "range" refers to a range of formulaic cells or an array of formulaic cells. In one embodiment, the values are returned in the same order as they were specified in. In another embodiment, only the first instance of any value is returned.

The example shown in FIG. 18 illustrates various primary contacts for number of specifications. Entry of the exemplary DISTINCT function shown returns a result of {Roy, Brandon, Sam} since these are the three distinct primary contacts in cells A2-A6. However, the DISTINCT function is not limited to the examples or syntax shown, and another syntax for the function may be used in conjunction with different parameters and arguments to produce similar results.

FIG. 19 illustrates a spreadsheet document including another automatically supplied function in accordance with the present invention. Spreadsheet document 1900 shows an example of a function referred to herein as the FILTER function. An example entry of the FILTER function is illustrated within formulaic cell 1902 and formula field 1904.

The FILTER function takes a set of values arranged in an array of formulaic cells and returns the set of values as a vertical array without any duplication of values. The syntax for the FILTER function is described according to the following:

FILTER(Table Array, criteria_column1, criteria1, [criteria_column2, criteria2] ... )  (20)

In expression (20), "table array" refer to the range to filter. "Criteria_column1, 2, etc." refers to the column in which to evaluate the associated criteria. "Criteria1, 2, etc." refers to the criterion in the form of a number expression or text that defines which cells to filter. For example, criteria can be expressed as 32, "32", ">32", "apples". The cells in the table array are included in the result array if all of the criteria specified are true for the cells.

The example shown in FIG. 19 is an example of various grades for a list of students. Entry of the exemplary FILTER function filters the array for the entries whose HW1 grade is greater than 65 and returns a result of {"Brandon", 95, 85, 100; "Charlie", 94, 80, 100; "Sam", 96, 90, 100}. However, the FILTER function is not limited to the examples or syntax shown, and another syntax for the function may be used in conjunction with different parameters and arguments to produce similar results.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computer-readable storage medium that is not a signal storing instructions executable by a computer system configured to generate a result, comprising:

instantiating a spreadsheet document by launching the spreadsheet application on a computing device, wherein the spreadsheet document includes a formulaic cell;

automatically supporting a non-user supplied conditional function in the formulaic cell, the conditional function automatically provided by the spreadsheet application such that a definition of the conditional function is automatically supplied with the spreadsheet application, the conditional function including at least one argument determining an operation of the conditional function according to an outcome of the argument; and allowing a user to select the conditional function from a plurality of conditional functions that are provided with each instantiation of the spreadsheet application and are non-user supplied, including at least:

a nonerror function that consists of receiving a single non-nested argument that specifies a range of cells in the form of C1:CN where C1 is a start of a range of cells and CN is an end of the range of cells from the formulaic cell that returns only values obtained from each cell within the specified range of cells within the spreadsheet document that do not correspond to an error while excluding a value being returned from each cell that corresponds to an error; wherein the nonerror function evaluates each cell within the specified range of cells to determine if a value within the cell does not correspond to an error and when the value within the cell corresponds to an error;

an if-error function comprising optional parameters that specify what type of errors to detect and configured to perform a specified function when a specified error is detected in a specified cell;

a distinct function configured to collect each of a plurality of values stored within a specified range of cells in the spreadsheet document meeting a condition that none of the values is repeated within the specified range, the distinct function that consists of receiving a single non-nested argument that specifies a range of cells that is specified in the form of D1:DN where D1 is a start of the specified range of cells and DN is an end of the specified range of cells;

a count-distinct function configured to count a number of values presented within a range of cells in the spreadsheet document meeting a condition that none of the values is repeated within the specified range of cells, the count-distinct function that consists of receiving a single non-nested argument that specifies a specified range of cells that is specified in the form of CD1:CDN where CD1 is a start of the specified range of cells and CDN is an end of the specified range of cells; and a filter function configured to return an array of values for each of a plurality of records within a specified range of cells within the spreadsheet document when at least one specified cell within each the records satisfies at least one specified criterion.

2. The computer-readable storage medium of claim 1, further comprising including in the list of conditional functions at least:

an average-if function configured to calculate an average of values stored in each of a plurality cells within a specified range of cells within the spreadsheet document when the value stored in each of the cells meets at least one criterion;

a sum-if function configured to calculate a sum of at least one plurality of cells within a specified range of cells within the spreadsheet document for each cell meeting at least one specified criterion; and a count-if function configured to count a number of cells within a specified range of cells within the spreadsheet document for each cell meeting at least one specified criterion.

3. The computer-readable medium of claim 1, further comprising allowing the user to select a conditional lookup function, the conditional lookup function being configured to return at least one value from a specified range of cells according to at least one specified lookup criterion.

4. The computer-readable medium of claim 3, wherein the conditional lookup function is further configured to return the at least one value from a specified two-dimensional range of cells that one of match or most nearly match a first dimension lookup value and a second dimension lookup value.

5. The computer-readable medium of claim 3, wherein the conditional function is further configured to return the at least one value from the specified range of cells when the at least one value does not exceed the at least one specified lookup criterion.

6. The computer-readable medium of claim 1, further comprising allowing the user to select a conditional word parsing function, the word parsing function being configured to return one of a specified word and a specified word count from a specified range according to at least one parsing condition.

7. The computer-readable medium of claim 1, further comprising allowing the user to select a date function, the date function being configured to determine one of a date and a number of days according to a specified argument applied to at least one specified date.

8. The computer-readable medium of claim 7, wherein the date function includes one of:

a date difference function configured to calculate a number of days between a specified first date and a specified second date;

a date add function configured to calculate an incremented date by adding a specified number of days to a specified start date;

a week number function configured to determine a week number of a specified date in a specified year.

9. The computer-readable medium of claim 1, further comprising allowing the user to select a concatenation function configured to join a group of values in a specified range, separating values in the group of values using a specified delimiter.

10. The computer-readable medium of claim 1, further comprising allowing the user to select a weighted average function, the weighted average function being configured to generate a value averaging values stored in a specified range of cells with a proportional relevance being applied to selected cells in the specified range.

11. The computer-readable medium of claim 1, further comprising allowing the user to select a sort range function, the sort range function being configured to return a sorted array of values from a specified range of cells in which the array of values returned is sorted according to at least one specified criterion.

12. A computer-readable storage medium that is not a signal storing instructions executable by a computer system to generate a result, comprising:

instantiating a spreadsheet document by launching the spreadsheet application on a computing device, wherein the spreadsheet document includes a formulaic cell;

with each launch of the spreadsheet application automatically supporting a function in the formulaic cell, the conditional function a non-user supplied function that is automatically provided by the spreadsheet application such that a definition of the conditional function is automatically supplied with the spreadsheet application, the function including at least one argument determining an operation of the function according to an outcome of the argument; and allowing a user to select the conditional function from a plurality of functions including at least:

a nonerror function consisting of a single non-nested argument that specifies a range of cells in the form of C1:CN where C1 is a start of a range of cells and CN is an end of the range of cells from the formulaic cell that returns only values obtained from each cell within a specified range of cells within the spreadsheet document that do not correspond to an error while excluding a value being returned from each cell that corresponds to an error;

a word parsing function, the word parsing function being configured to return a specified word from a specified text according to at least one parsing condition, the word parsing condition including a word position and the word parsing function configured to receive parameters including one or more delimiters, the word parsing function configured to determine tokens from the text by determining the tokens between the one or more delimiters and returning the token specified by the word position;

a date function configured to determine one of a date and a number of days according to a specified argument applied to at least one specified date; and a concatenation function configured to join a group of values in a specified range, separating values in the group of values using a specified delimiter; and an if-error function comprising optional parameters that specify what type of errors to detect and configured to perform a specified function when a specified error is detected in a specified cell.

13. The computer-readable storage medium of claim 12, further comprising including in the list of conditional functions an average-if function configured to calculate an average of values stored in each of a plurality cells within a specified range when the value stored in each of the cells meets at least one criterion.

14. The computer-readable storage medium of claim 12, further comprising including in the list of conditional functions one or more of:

a conditional function configured to perform a specified function when at least one specified condition is met;

a conditional lookup function, the conditional lookup function being configured to return at least one value from a specified range of cells according to at least one specified lookup criterion;

a weighted average function, the weighted average function being configured to generate a value averaging values stored in a specified range of cells with a proportional relevance being applied to selected cells in the specified range; and a sort range function, the sort range function being configured to return a sorted array of values from a specified range of cells in which the array of values returned is sorted according to at least one specified criterion.

15. The computer-readable medium of claim 12, wherein the at least one conditional lookup function is further configured to return the at least one value from a specified two-dimensional range of cells that one of match or most nearly match a first dimension lookup value and a second dimension lookup value.

16. The computer-readable medium of claim 12, wherein the date function includes one of:

a date difference function configured to calculate a number of days between a specified first date and a specified second date;

a date add function configured to calculate an incremented date by adding a specified number of days to a specified start date;

a week number function configured to determine a week number of a specified date in a specified year.

17. A computer-implemented method, comprising:

in a spreadsheet document, automatically supporting a function in a formulaic cell, the conditional function is a non-user supplied function that is automatically provided by the spreadsheet application, the function including at least one argument determining an operation of the function according to an outcome of the argument; and allowing a user to select the conditional function from a plurality of functions including:

a conditional function configured to perform a specified function when at least one specified condition is met;

a conditional lookup function, the conditional lookup function being configured to return at least one value from a specified range of cells according to at least one specified lookup criterion;

a nonerror function consisting of a single non-nested argument that specifies a range of cells in the form of C1:CN where C1 is a start of a range of cells and CN is an end of the range of cells from the formulaic cell that returns only values obtained from each cell within a specified range of cells within the spreadsheet document that do not correspond to an error while excluding a value being returned from each cell that corresponds to an error;

an if-error function comprising optional parameters that specify what type of errors to detect and configured to perform a specified function when a specified error is detected in a specified cell;

a word parsing function, the word parsing function being configured to return one of a specified word and a specified word count from a specified range according to at least one parsing condition;

a date function configured to determine one of a date and a number of days according to a specified argument applied to at least one specified date;

a concatenation function configured to join a group of values in a specified range, separating values in the group of values using a specified delimiter;

a weighted average function, the weighted average function being configured to generate a value averaging values stored in a specified range of cells with a proportional relevance being applied to selected cells in the specified range; and a sort range function, the sort range function being configured to return a sorted array of values from a specified range of cells in which the array of values returned is sorted according to at least one specified criterion.

18. The computer-implemented method of claim 17, further comprising including in the list of conditional functions an average-if function configured to calculate an average of values stored in each of a plurality cells within a specified range when the value stored in each of the cells meets at least one criterion.

19. A computer-readable storage medium that is not a signal storing instructions executable by a computer system configured to display a result, comprising:

instantiating a spreadsheet document by launching the spreadsheet application on a computing device, wherein the spreadsheet document includes a formulaic cell;

automatically supporting a conditional function that is a non-user supplied function in the formulaic cell with each launch of the spreadsheet application, the conditional function automatically provided by the spreadsheet application such that a definition of the conditional function is automatically supplied with the spreadsheet application; and allowing a user to select the conditional function from a plurality of conditional functions including at least:

an if-error function comprising optional parameters that specify what type of errors to detect and configured to perform a specified function when a specified error is detected in a specified cell.

20. The computer-readable medium of claim 19 wherein the function further comprises optional parameters when the function is not the iferror function.

21. A computer-readable storage medium that is not a signal storing instructions executable by a computer system configured to display a result, comprising:

instantiating a spreadsheet document by launching the spreadsheet application on a computing device, wherein the spreadsheet document includes a formulaic cell;
automatically supporting a conditional function that is a non-user supplied function in the formulaic cell with each launch of the spreadsheet application, the conditional function automatically provided by the spreadsheet application such that a definition of the conditional function is automatically supplied with the spreadsheet application; and
allowing a user to select the conditional function from a plurality of conditional functions including at least:
an averageif function consisting of three parameters specified in order, the three parameters consisting of:
a first parameter specifying a range of cells;
a second parameter specifying criteria;
a third parameter, the third parameter specifying an average range of cells;
determining the result of the averageif function by:
in response to the user not specifying the third parameter:
determining a return value of an average of values in the range of cells specified by the first parameter if the criteria specified by the second parameter is true for each cell in the range of cells specified by the first parameter;
in response to the user specifying the third parameter:
determining the return value of an average of values in the average range of cells specified by the third parameter if the criteria specified by the second parameter is true for each cell in the range of cells specified by the first parameter;
displaying the return value in the formulaic cell; and
an if-error function comprising optional parameters that specify what type of errors to detect and configured to perform a specified function when a specified error is detected in a specified cell.

22. A computer-readable storage medium that is not a signal storing instructions executable by a computer system configured to display a result, comprising:
instantiating a spreadsheet document by launching the spreadsheet application on a computing device, wherein the spreadsheet document includes a formulaic cell;
automatically supporting a function in the formulaic cell, the function automatically provided by the spreadsheet application such that a definition of the function is automatically supplied with the spreadsheet application; wherein the function is a non-user supplied function; and
allowing a user to select the conditional function from a plurality of conditional functions including at least:
a nonerror function consisting of a single non-nested argument from the formulaic cell that returns only values obtained from each cell within a specified range of cells within the spreadsheet document that do not correspond to an error while excluding a value being returned from each cell that corresponds to an error;
an if-error function comprising optional parameters that specify what type of errors to detect and configured to perform a specified function when a specified error is detected in a specified cell;
a sumifs function comprising parameters specified in order, the parameters comprising:
a first parameter specifying a range of cells;
a second parameter specifying a first criteria range of cells;
a third parameter specifying a criteria to evaluate for the first criteria range of cells;
a fourth optional parameter specifying a second criteria range of cells;
a fifth optional parameter specifying a second criteria to evaluate for the second criteria range of cells;
for each cell in the first criteria range of cells specified by the second parameter, determining whether the criteria specified by the third parameter evaluates to true, and in response to determining the criteria specified by the third parameter evaluates to true adding a value of a corresponding cell specified by the range of cells specified by the first parameter to a return value; and
for each cell in the second criteria range of cells specified by the fourth optional parameter, determining whether the criteria specified by the fifth optional parameter evaluates to true, and in response to determining the criteria specified by the fifth optional parameter evaluates to true adding a value of a corresponding cell specified by the range of cells specified by the first parameter to the return value; and
displaying the return value in the formulaic cell.

23. A computer-readable storage medium that is not a signal storing instructions executable by a computer system configured to display a result, comprising:
instantiating a spreadsheet document by launching the spreadsheet application on a computing device, wherein the spreadsheet document includes a formulaic cell;
automatically supporting a function that is a non-user supplied function in the formulaic cell, the function automatically provided by the spreadsheet application such that a definition of the function is automatically supplied with the spreadsheet application; and
allowing a user to select the conditional function from a plurality of conditional functions including at least:
a nonerror function consisting of a single non-nested argument from the formulaic cell that returns only values obtained from each cell within a specified range of cells within the spreadsheet document that do not correspond to an error while excluding a value being returned from each cell that corresponds to an error;
an if-error function comprising optional parameters that specify what type of errors to detect and configured to perform a specified function when a specified error is detected in a specified cell;
an averageifs function comprising parameters specified in order, the parameters comprising:
a first parameter specifying a range of cells;
a second parameter specifying a first criteria range of cells;
a third parameter specifying a criteria to evaluate for the first criteria range of cells;
a fourth optional parameter specifying a second criteria range of cells;
a fifth optional parameter specifying a second criteria to evaluate for the second criteria range of cells;
for each cell in the first criteria range of cells specified by the second parameter, determining whether the criteria specified by the third parameter evaluates to true, and in response to determining the criteria specified by the third parameter evaluates to true averaging a value of a corresponding cell specified by the range of cells specified by the first parameter to a return value; and
for each cell in the second criteria range of cells specified by the fourth optional parameter, determining whether the criteria specified by the fifth optional parameter evaluates to true, and in response to determining the criteria specified by the fifth optional parameter evaluates to true averaging a value of a corresponding cell specified by the range of cells specified by the first parameter to the return value; and
displaying the return value in the formulaic cell.

* * * * *